(12) United States Patent
Klug et al.

(10) Patent No.: US 9,541,998 B2
(45) Date of Patent: Jan. 10, 2017

(54) ELECTRONIC SYSTEM WITH GAZE ALIGNMENT MECHANISM AND METHOD OF OPERATION THEREOF

(71) Applicant: Samsung Electronics Co., Ltd., Suwon-si, Gyeonggi-Do (KR)

(72) Inventors: Michael A. Klug, Austin, TX (US); Henry Holtzman, San Francisco, CA (US); Jaewoo Chung, San Francisco, CA (US); Anette Freiin von Kapri, San Francisco, CA (US); Michael Lapinski, San Francisco, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/609,056

(22) Filed: Jan. 29, 2015

(65) Prior Publication Data

US 2016/0227164 A1    Aug. 4, 2016

(51) Int. Cl.
| | | |
|---|---|---|
| *H04N 7/15* | (2006.01) | |
| *G06F 3/01* | (2006.01) | |
| *G02B 5/18* | (2006.01) | |
| *H04N 5/232* | (2006.01) | |
| *H04N 7/14* | (2006.01) | |

(52) U.S. Cl.
CPC ............ *G06F 3/013* (2013.01); *G02B 5/1842* (2013.01); *H04N 5/23229* (2013.01); *H04N 7/144* (2013.01)

(58) Field of Classification Search
CPC .... H04N 5/23229; G02B 5/1842; G06F 3/013
USPC ......... 235/492; 345/204; 356/305, 319, 328, 356/445, 521, 630; 427/9; 348/14.07, 14.08, 348/14.09, 14.16; 351/204, 210; 382/154, 275; 600/401; 607/89
See application file for complete search history.

(56) References Cited

U.S. PATENT DOCUMENTS

| | | | | |
|---|---|---|---|---|
| 4,441,814 A * | 4/1984 | Buchanan | ................ | G01J 3/28 356/305 |
| 4,828,387 A * | 5/1989 | Sawyers | ................... | G01J 3/42 356/319 |
| 5,382,972 A | 1/1995 | Kannes | | |
| 5,500,671 A | 3/1996 | Andersson et al. | | |
| 5,612,734 A | 3/1997 | Nelson et al. | | |
| 5,695,808 A * | 12/1997 | Cueli | .................. | C23C 14/0629 427/248.1 |
| 5,822,066 A * | 10/1998 | Jeong | ................... | G01B 11/255 356/513 |
| 5,953,053 A | 9/1999 | Chen et al. | | |
| 6,088,013 A * | 7/2000 | Montour et al. | ........ | G09F 9/377 345/109 |
| 6,188,501 B1 * | 2/2001 | Neushul | ............... | G02B 27/023 358/474 |
| 6,259,470 B1 | 7/2001 | Koizumi et al. | | |

(Continued)

OTHER PUBLICATIONS

Jensen et al., "EyeGaze: Eye Contact and Gaze Awareness in Video", 2013.

(Continued)

*Primary Examiner* — Gerald Gauthier
(74) *Attorney, Agent, or Firm* — IP Investment Law Group

(57) ABSTRACT

An electronic system includes a reflective film including a diffraction grating configured to reflect an image within a reflective grating spectra at a reflection angle; and an image capture unit positioned at a device orientation to capture the image reflected from the reflective film.

20 Claims, 10 Drawing Sheets

(56) References Cited

U.S. PATENT DOCUMENTS

| | | | |
|---|---|---|---|
| 6,273,566 B1* | 8/2001 | Kobayashi | A61B 3/032 351/221 |
| 6,507,357 B2 | 1/2003 | Hillis et al. | |
| 6,714,234 B1 | 3/2004 | Hillis et al. | |
| 6,894,851 B2* | 5/2005 | Yamazaki | G02B 6/29398 359/819 |
| 6,985,294 B1* | 1/2006 | Rosenthal | H04N 9/3161 348/E5.142 |
| 7,116,350 B2 | 10/2006 | Allen et al. | |
| 7,116,418 B2* | 10/2006 | Richman | G01J 3/02 356/305 |
| 7,257,272 B2* | 8/2007 | Blake | G06T 5/50 348/E13.023 |
| 7,311,723 B2* | 12/2007 | Seibel | A61F 9/08 128/898 |
| 7,524,062 B2* | 4/2009 | Iwa | A61B 3/12 351/206 |
| 7,570,803 B2* | 8/2009 | Criminisi | G06T 7/0022 382/154 |
| 7,808,540 B2 | 10/2010 | Cok | |
| 7,957,581 B2 | 6/2011 | Wu | |
| 8,203,591 B2* | 6/2012 | Hubenthal | H04N 7/15 348/14.07 |
| 8,282,222 B2 | 10/2012 | Smits | |
| 8,325,166 B2* | 12/2012 | Akutsu | G02B 5/203 345/204 |
| 8,446,455 B2* | 5/2013 | Lian | H04N 7/15 348/14.08 |
| 8,467,510 B2 | 6/2013 | Hillis et al. | |
| 8,587,634 B1* | 11/2013 | Baldino | H04N 7/15 348/14.08 |
| 8,652,044 B2* | 2/2014 | Abramov | A61B 3/165 351/206 |
| 8,670,019 B2* | 3/2014 | Byers | H04N 7/144 348/14.01 |
| 9,188,484 B2* | 11/2015 | Jhon | G01J 3/0297 |
| 9,213,163 B2* | 12/2015 | Lewis | G02B 7/12 |
| 2004/0252276 A1* | 12/2004 | Nanjo | A61B 3/14 351/206 |
| 2006/0077346 A1* | 4/2006 | Matsumoto | A61B 3/12 351/214 |
| 2006/0256219 A1 | 11/2006 | Schroderus | |
| 2006/0290100 A1* | 12/2006 | Miller | B60D 1/06 280/477 |
| 2008/0106591 A1 | 5/2008 | Border et al. | |
| 2009/0168079 A1* | 7/2009 | Yang | G01B 11/0633 356/630 |
| 2009/0302120 A1* | 12/2009 | Omura | G03H 1/02 235/492 |
| 2011/0118748 A1* | 5/2011 | Itkowitz | A61B 19/2203 606/130 |
| 2012/0133944 A1* | 5/2012 | Iwasaki | G01J 3/0205 356/445 |
| 2012/0274734 A1 | 11/2012 | Byers | |
| 2012/0274735 A1* | 11/2012 | Byers | H04N 7/144 348/14.16 |
| 2013/0002846 A1 | 1/2013 | De Bruijn et al. | |
| 2013/0050642 A1* | 2/2013 | Lewis | A61B 3/113 351/204 |
| 2013/0147919 A1* | 6/2013 | Xia | H04N 13/0203 348/46 |
| 2013/0155176 A1 | 6/2013 | Paripally et al. | |
| 2013/0222522 A1 | 8/2013 | Fussy | |
| 2013/0286346 A1* | 10/2013 | Tsai | A61B 3/0091 351/206 |
| 2014/0118604 A1 | 5/2014 | Denis | |
| 2014/0125559 A1* | 5/2014 | Lu | G02B 27/0172 345/8 |
| 2014/0146148 A1* | 5/2014 | Maciocci | G06F 3/013 348/59 |
| 2014/0240675 A1* | 8/2014 | Narasimha-Iyer | A61B 3/0091 351/210 |
| 2014/0355841 A1* | 12/2014 | Santos-Villalobos | G06K 9/0061 382/117 |
| 2016/0091720 A1* | 3/2016 | Stafford | G02B 27/0172 345/8 |
| 2016/0154620 A1* | 6/2016 | Tsuda | G06F 19/3481 345/633 |

OTHER PUBLICATIONS

CRC Press, "3D Television Technology, Systems, and Deployment", 2014.

\* cited by examiner

ELECTRONIC SYSTEM WITH GAZE ALIGNMENT MECHANISM AND METHOD OF OPERATION THEREOF

TECHNICAL FIELD

An embodiment of the present invention relates generally to an electronic system, and more particularly to a system with a gaze alignment mechanism.

BACKGROUND

Modern consumer and industrial electronics, especially communication devices such as smartphones, tablets, laptops with embedded webcams, and video conferencing systems are providing increasing levels of functionality to support modem life including facilitating interactions with other electronic devices and users. Research and development in the existing technologies can take a myriad of different directions.

As users become more empowered with the growth of communication devices, new and old paradigms begin to take advantage of this new device space. There are many technological solutions to take advantage of this new device capability to communicate with other users and other devices. However, video communications using such devices often feel awkward and impersonal for both the viewer and the viewee.

Thus, a need still remains for an electronic system with a gaze alignment mechanism appropriate for today's communication needs. In view of the ever-increasing commercial competitive pressures, along with growing client expectations and the diminishing opportunities for meaningful product differentiation in the marketplace, it is increasingly critical that answers be found to these problems.

Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including a reflective film including a diffracting grating configured to reflect an image within a reflective grating spectra at a reflection angle; and an image capture unit positioned at a device orientation to capture the image reflected from the reflective film.

An embodiment of the present invention provides a method of operation of an electronic system including reflecting, with a reflective film including a diffraction grating, an image within a reflective grating spectra at a reflection angle; and capturing, with an image capture unit positioned at a device orientation, the image reflected from the reflective film.

An embodiment of the present invention provides another method of operation of an electronic system including communicating an image within a reflective grating spectra; and applying, with a control unit, an image processing mechanism to the image for processing the image reflected from a reflective film at a reflection angle and captured by an image capture unit at a device orientation aligned with the reflection angle.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
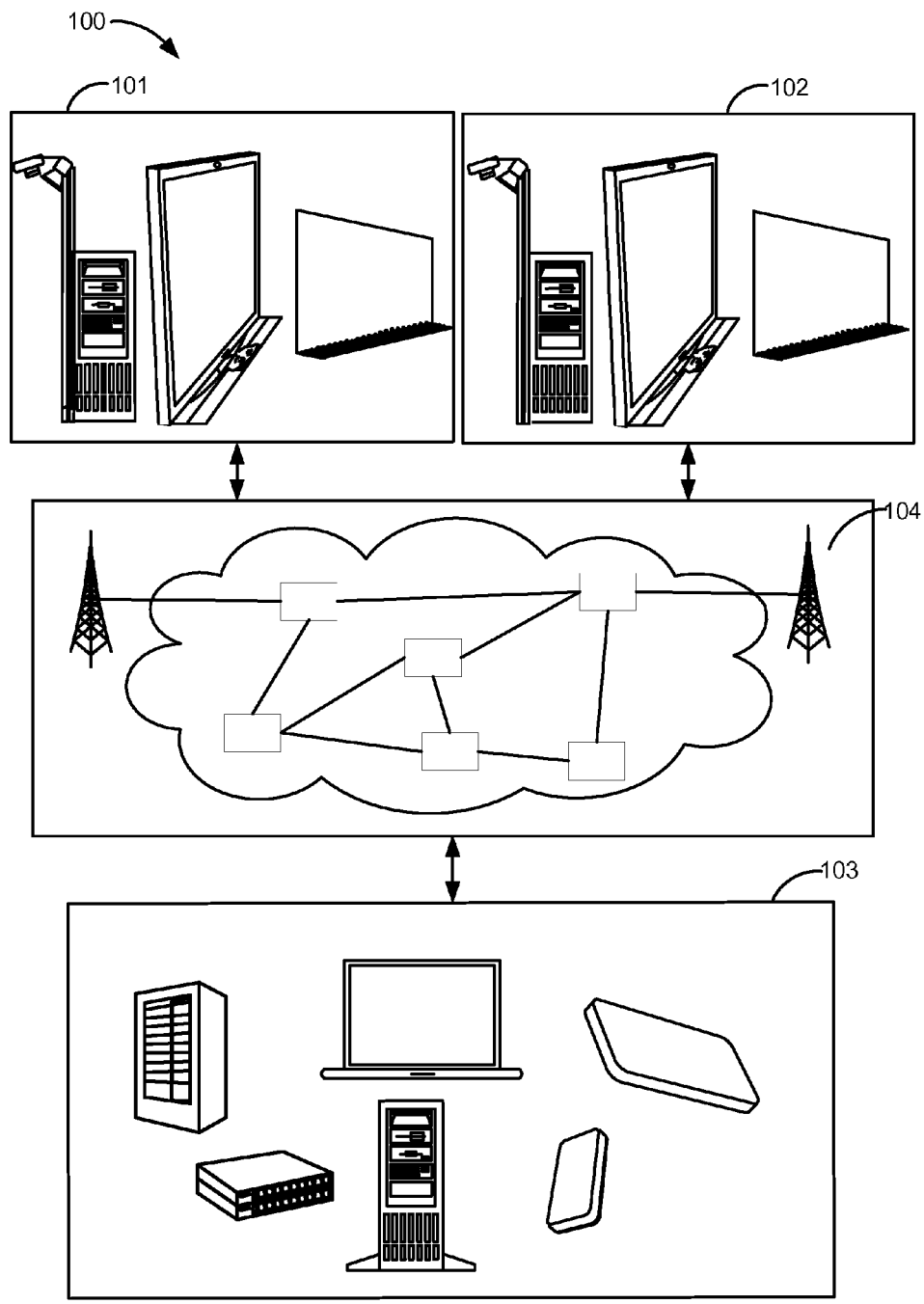
FIG. 1 is an electronic system with a gaze alignment mechanism in an embodiment of the present invention.

Embodiments of the present invention provide a more cost-effective solution to solving gaze alignment problems pertaining to video communication or conferencing systems. For example, a reflective film of the present invention can be laminated or affixed directly to a screen or surface of the display interface. This saves a display manufacturer from having to retool or change existing manufacturing equipment or processes to solve gaze alignment problems.

Embodiments of the present invention can also provide a more scalable solution to solving gaze alignment problems. For example, the size of a reflective film of the present invention can be increased or decreased to accommodate a range of display screen dimensions. In addition, the reflective film can be adopted for display interfaces up to and including human-size display interfaces.

Embodiments of the present invention can also provide a more efficient and less intrusive system for aligning a gaze of a first user with a gaze of a second user. For example, a reflective film of the present invention can be laminated to a display interface and a notch filter can be easily attached to the lens of an image capture unit. Unlike other video communications systems which utilize beam splitters and half-silvered mirrors, the components of the present invention are lightweight, portable, and take advantage of existing device hardware and software capabilities.

Embodiments of the present invention can also improve the user experience of video communications systems by providing a user-specific parallax perspective. For example, as a viewer position of the first user changes, the perspective of the image of a second user displayed on a display interface also changes. Providing the first user and the second user with this parallax functionality allows the present invention to more closely mimic in-person communications settings in the real world.

For descriptive purposes, the term "normal" as used herein is defined as a direction or line orthogonal to a plane or surface. As an example, a reference to a line normal to a display interface refers to the line or vector orthogonal to the display interface at a point of intersection between the line or vector and the display interface. The term "on" means that there is direct contact among elements without having intervening materials.

Also for descriptive purposes, the term "horizontal" as used herein is defined as a direction or line parallel to a floor, ceiling, or supporting surface such as a table top or desk top. As an example, a reference to horizontal line refers to a line parallel to the floor, the ceiling, or a table or desk top on which a device is placed.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

Referring now to FIG. 1, therein is shown an electronic system 100 with a gaze alignment mechanism in an embodiment of the present invention. The electronic system 100 includes a first device 101, such as a client device, and a second device 102, such as another client device, connected to a third device 103, a server device. The first device 101, the second device 102, and the third device 103 can communicate with each other through a communication path 104, such as a wireless or wired network.

For illustrative purposes, the electronic system 100 is described with the first device 101 and the second device 102 as types of devices for displaying images, although it is understood that the first device 101, the second device 102, or a combination thereof can be different types of devices. For example, the first device 101, the second device 102, or a combination thereof can be any of a variety of devices, such as a laptop, a tablet device, a mobile device, a cellular phone, a smartphone, a holographic presentation device, a virtual reality device, a video conferencing device, or other multi-functional devices. Also for example, the first device 101, the second device 102, or a combination thereof can include a server or a centralized computing device. The first device 101, the second device 102, or a combination thereof can couple to the communication path 104 to communicate with the third device 103.

The third device 103 can also be a mobile device or a non-mobile device. For example, the third device 103 can be any of a variety of mobile devices, such as a smartphone, a tablet device, a cellular phone, a wearable device, a notebook computer, a thin client device, a multi-functional mobile communication or entertainment device, or a combination thereof.

The third device 103 can also be a non-mobile device such as any of a variety of centralized or decentralized computing devices. For example, the third device 103 can be a desktop computer, a grid computing resource, a server, a server farm, a virtualized computing resource, a cloud computing resource, a router, a switch, a peer-to-peer distributed computing resource, or a combination thereof.

The third device 103 can be centralized in a single computer room, distributed across different rooms, distributed across different geographical locations, or embedded within a telecommunications network. For example, the third device 103 can be a particularized machine, such as a mainframe, a server, a cluster server, a rack mounted server, or a blade server, or as more specific examples, an IBM System z10™ Business Class mainframe or a HP ProLiant ML™ server. The third device 103 can couple with the communication path 104 to communicate with the first device 101, the second device 102, or a combination thereof.

For illustrative purposes, the electronic system 100 is described with the third device 103 as a server or a central computing device, although it is understood that the third device 103 can also include types of devices for displaying images. Also for illustrative purposes, the electronic system 100 is shown with the first device 101, the second device 102, and the third device 103 as end points of the communication path 104, although it is understood that the electronic system 100 can have a different partition between the first device 101, the second device 102, the third device 103, and the communication path 104. For example, the first device 101, the second device 102, the third device 103, or a combination thereof can also function as part of the communication path 104.

The communication path 104 can include a variety of networks or communication mediums. For example, the communication path 104 can include a medium or a component for wireless communication, wired communication, optical communication, or a combination thereof. Satellite communication, cellular communication, Bluetooth™, Bluetooth™ Low Energy (BLE), wireless High-Definition Multimedia Interface (HDMI), ZigBee™, Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include a direct connection, personal area network (PAN), local area network (LAN), metropolitan area network (MAN), wide area network (WAN) or any combination thereof.

Figure 2:
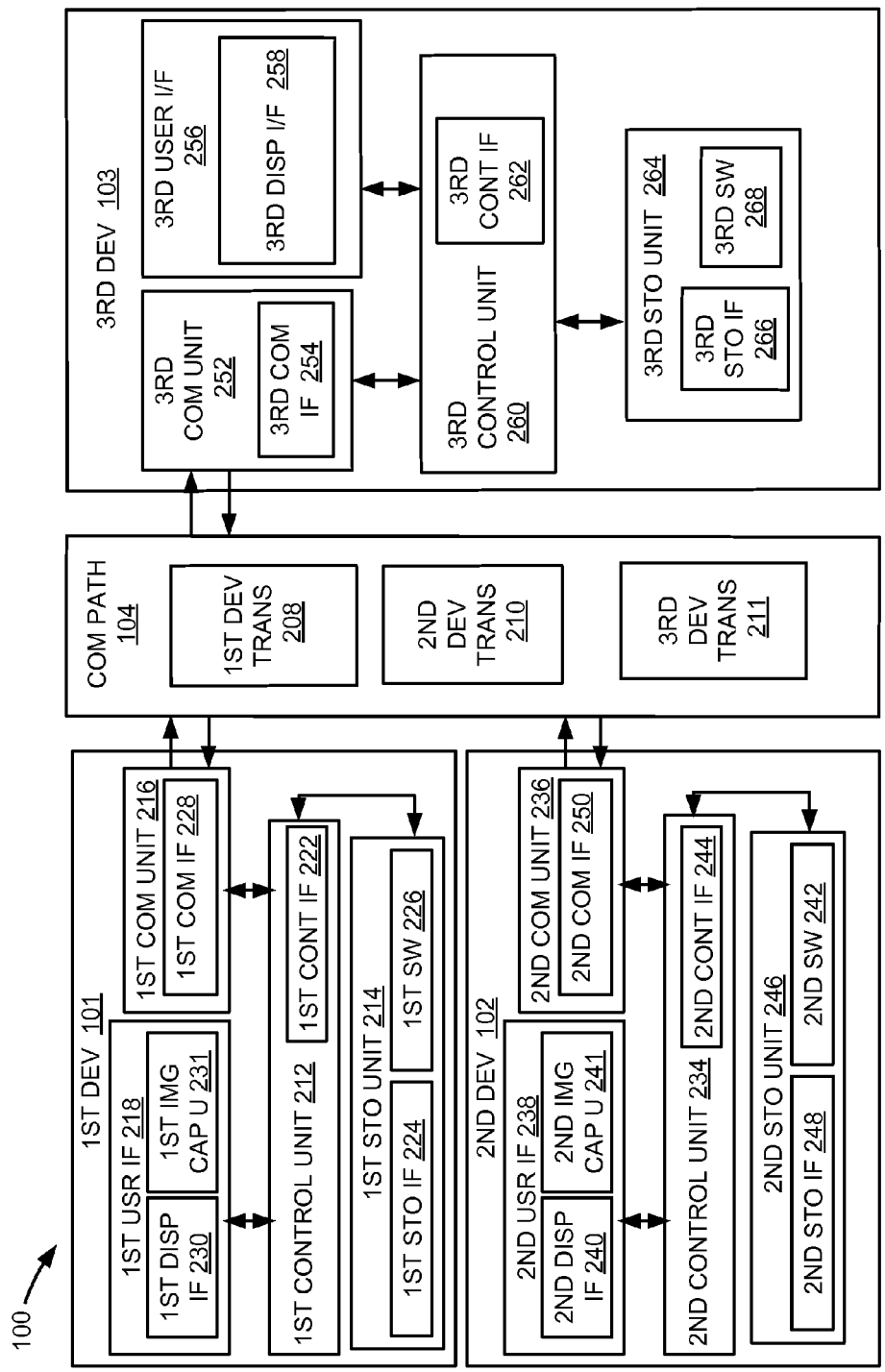
FIG. 2 is an example block diagram of the electronic system.

Referring now to FIG. 2, therein is shown an exemplary block diagram of the electronic system 100. The electronic system 100 can include the first device 101, the second device 102, the communication path 104, and the third device 103. The first device 101 can send information in a first device transmission 208 over the communication path 104 to the second device 102, the third device 103, or a combination thereof. The second device 102 can send information in a second device transmission 210 over the communication path 104 to the first device 101, the third device 103, or a combination thereof. The third device 103 can send information in a third device transmission 211 over the communication path 104 to the first device 101, the second device 102, or a combination thereof.

For brevity of description in this embodiment of the present invention, the first device 101 and the second device 102 will be described as client devices and the third device 106 will be described as a server device. Embodiments of the present invention are not limited to this selection for the type of devices. The selection is an example of the embodiments of the present invention.

The first device 101 can include a first control unit 212, a first storage unit 214, a first communication unit 216, and a first user interface 218. The first control unit 212 can include a first control interface 222. The first control unit 212 can execute a first software 226 to provide the intelligence of the electronic system 100. The first control unit 212 can be implemented in a number of different manners.

For example, the first control unit 212 can be a processor, an embedded processor, a microprocessor, a hardware control logic, a hardware finite state machine (FSM), a digital signal processor (DSP), or a combination thereof. The first control interface 222 can be used for communication between the first control unit 212 and other functional units in the first device 101. The first control interface 222 can also be used for communication that is external to the first device 101.

The first control interface 222 can receive information from the other functional units or from external sources, or can transmit information to the other functional units or to external destinations. The external sources and the external destinations refer to sources and destinations external to the first device 101.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store relevant information, such as images, audio files, videos, spectra information, or any combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 101. The first storage interface 224 can also be used for communication that is external to the first device 101.

The first storage interface 224 can receive information from the other functional units or from external sources, or can transmit information to the other functional units or to external destinations. The external sources and the external destinations refer to sources and destinations external to the first device 101.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 101. For example, the first communication unit 216 can permit the first device 101 to communicate with the second device 102, the third device 103, an attachment such as a peripheral device or a notebook computer, and the communication path 104.

The first communication unit 216 can also function as a communication hub allowing the first device 101 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 101. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 101. The first user interface 218 can include an input device and an output device. Examples of the input device of the first user interface 218 can include a first image capture unit 231, a microphone, a keypad, a touchpad, soft-keys, a keyboard, or any combination thereof to provide data and communication inputs.

The first image capture unit 231 can capture static images, video, light reflectance, IR signatures, UV signatures, or a combination thereof. The first image capture unit 231 can be implemented in many ways. For example, the first image capture unit 231 can be implemented as one or more two-dimensional (2D) cameras, three-dimensional (3D) cameras, stereoscopic cameras, optical sensors, low-light cameras, IR sensors, UV sensors, thermal imaging cameras, or a combination thereof. In addition, the first image capture unit 231 can include a depth sensor, a motion sensor, an active pixel sensor, a charge-coupled sensor, a CMOS sensor, or a combination thereof. As a more specific example, when the first image capture unit 231 is a 2D camera, the first device 101 can use computer vision to calculate a depth of a joint or body part of the user.

Examples of the output device of the first user interface 218 can include a first display interface 230. The first display interface 230 can include a display, a projector, a video screen, a speaker, or any combination thereof.

For illustrative purposes, the first image capture unit 231 is shown as separate from the first display interface 230, however, it should be understood that the first image capture unit 231 can encompass any number of components of the first user interface 218 including a portion of the first display interface 230. In addition, while the first image capture unit 231 is shown as being embedded in the first device 101, it should be understood that the first image capture unit 231 can operate on the periphery or outside of the first device 101.

The first control unit 212 can operate the first user interface 218 to display information generated by the electronic system 100. The first control unit 212 can also execute the first software 226 for the other functions of the electronic system 100. The first control unit 212 can further execute the first software 226 for interaction with the communication path 104 via the first communication unit 216.

The second device 102 can include a second control unit 234, a second storage unit 246, a second communication unit 236, and a second user interface 238. The second control unit 234 can include a second control interface 244. The second control unit 234 can execute a second software 242 to provide the intelligence of the electronic system 100. The second control unit 234 can be implemented in a number of different manners.

For example, the second control unit 234 can be a processor, an embedded processor, a microprocessor, a hardware control logic, a hardware finite state machine (FSM), a digital signal processor (DSP), or a combination thereof. The second control interface 244 can be used for communication between the second control unit 234 and other functional units in the second device 102. The second control interface 244 can also be used for communication that is external to the second device 102.

The second control interface 244 can receive information from the other functional units or from external sources, or can transmit information to the other functional units or to external destinations. The external sources and the external destinations refer to sources and destinations external to the second device 102.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

The second storage unit 246 can store the second software 242. The second storage unit 246 can also store relevant information, such as images, audio files, videos, spectra information, or any combination thereof.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 102. The second storage interface 248 can also be used for communication that is external to the second device 102.

The second storage interface 248 can receive information from the other functional units or from external sources, or can transmit information to the other functional units or to external destinations. The external sources and the external destinations refer to sources and destinations external to the second device 102.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 102. For example, the second communication unit 236 can permit the second device 102 to communicate with the first device 101, the third device 103, an attachment such as a peripheral device or a notebook computer, and the communication path 104.

The second communication unit 236 can also function as a communication hub allowing the second device 102 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 102. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The second user interface 238 allows a user (not shown) to interface and interact with the second device 102. The second user interface 238 can include an input device and an output device. Examples of the input device of the second user interface 238 can include a second image capture unit 241, a microphone, a keypad, a touchpad, soft-keys, a keyboard, or any combination thereof to provide data and communication inputs.

The second image capture unit 241 can capture static images, video, light reflectance, IR signatures, UV signatures, or a combination thereof. The second image capture unit 241 can be implemented in many ways. For example, the second image capture unit 241 can be implemented as one or more two-dimensional (2D) cameras, three-dimensional (3D) cameras, stereoscopic cameras, optical sensors, low-light cameras, IR sensors, UV sensors, thermal imaging cameras, or a combination thereof. In addition, the second image capture unit 241 can include a depth sensor, a motion sensor, an active pixel sensor, a charge-coupled sensor, a CMOS sensor, or a combination thereof. As a more specific example, when the second image capture unit 241 is a 2D camera, the second device 102 can use computer vision to calculate a depth of a joint or body part of the user.

Examples of the output device of the second user interface 238 can include a second display interface 240. The second display interface 240 can include a display, a projector, a video screen, a speaker, or any combination thereof.

For illustrative purposes, the second image capture unit 241 is shown as separate from the second display interface 240, however, it should be understood that the second image capture unit 241 can encompass any number of components of the second user interface 238 including a portion of the second display interface 240. In addition, while the second image capture unit 241 is shown as being embedded in the second device 102, it should be understood that the second image capture unit 241 can operate on the periphery or outside of the second device 102.

The second control unit 234 can operate the second user interface 238 to display information generated by the electronic system 100. The second control unit 234 can also execute the second software 242 for the other functions of the electronic system 100. The second control unit 234 can further execute the second software 242 for interaction with the communication path 104 via the second communication unit 236.

The third device 103 can be optimized for implementing the various embodiments in a multiple device embodiment with the first device 101, the second device 102, or a combination thereof. The third device 103 can provide the additional or higher performance processing power compared to the first device 101, the second device 102, or a combination thereof. The third device 103 can include a third control unit 260, a third communication unit 252, and a third user interface 256.

The third user interface 256 allows the user to interface and interact with the third device 103. The third user interface 256 can include an input device and an output device. Examples of the input device of the third user interface 256 can include a microphone, a keypad, a touchpad, soft-keys, a keyboard, or any combination thereof to provide data and communication inputs.

Examples of the output device of the third user interface 256 can include a third display interface 258. The third display interface 258 can include a display, a projector, a video screen, a speaker, or any combination thereof.

The third control unit 260 can execute a third software 268 to provide the intelligence of the third device 103 of the electronic system 100. The third software 268 can operate in conjunction with the first software 226, the second software 242, or a combination thereof. The third control unit 260 can provide additional performance compared to the first control unit 212, the second control unit 234, or a combination thereof.

The third control unit 260 can operate the third user interface 256 to display information. The third control unit 260 can also execute the third software 268 for the other functions of the electronic system 100, including operating the third communication unit 252 to communicate with the first device 101, the second device 102, or a combination thereof over the communication path 104.

The third control unit 260 can be implemented in a number of different manners. For example, the third control unit 260 can be a processor, an embedded processor, a microprocessor, a hardware control logic, a hardware finite state machine (FSM), a digital signal processor (DSP), or a combination thereof.

The third control unit 260 can include a third controller interface 262. The third controller interface 262 can be used for communication between the third control unit 260 and other functional units in the third device 103. The third controller interface 262 can also be used for communication that is external to the third device 103.

The third controller interface 262 can receive information from the other functional units or from external sources, or can transmit information to the other functional units or to external destinations. The external sources and the external destinations refer to sources and destinations external to the third device 103.

The third controller interface 262 can be implemented in different ways and can include different implementations depending on which functional units or external units are being interfaced with the third controller interface 262. For example, the third controller interface 262 can be implemented with a pressure sensor, an inertial sensor, a microelectromechanical system (MEMS), optical circuitry, waveguides, wireless circuitry, wireline circuitry, or a combination thereof.

A third storage unit 264 can store the third software 268. The third storage unit 264 can also store the relevant information, such as images, videos, spectra information, or any combination thereof. The third storage unit 264 can be sized to provide the additional storage capacity to supplement the first storage unit 214, the second storage unit 246, or a combination thereof.

For illustrative purposes, the third storage unit 264 is shown as a single element, although it is understood that the third storage unit 264 can be a distribution of storage elements. Also for illustrative purposes, the electronic system 100 is shown with the third storage unit 264 as a single hierarchy storage system, although it is understood that the electronic system 100 can have the third storage unit 264 in a different configuration. For example, the third storage unit 264 can be formed with different storage technologies forming a memory hierarchal system including different levels of caching, main memory, rotating media, or off-line storage.

The third storage unit 264 can be a volatile memory, a nonvolatile memory, an internal memory, an external memory, or a combination thereof. For example, the third storage unit 264 can be a nonvolatile storage such as non-volatile random access memory (NVRAM), Flash memory, disk storage, or a volatile storage such as static random access memory (SRAM).

The third storage unit 264 can include a third storage interface 266. The third storage interface 266 can be used for communication between the third storage unit 264 and other functional units in the third device 103. The third storage interface 266 can also be used for communication that is external to the third device 103.

The third storage interface 266 can receive information from the other functional units or from external sources, or can transmit information to the other functional units or to external destinations. The external sources and the external destinations refer to sources and destinations external to the third device 103.

The third storage interface 266 can include different implementations depending on which functional units or external units are being interfaced with the third storage unit 264. The third storage interface 266 can be implemented with technologies and techniques similar to the implementation of the third controller interface 262.

The third communication unit 252 can enable external communication to and from the third device 103. For example, the third communication unit 252 can permit the third device 103 to communicate with the first device 101, the second device 102, or a combination thereof over the communication path 104.

The third communication unit 252 can also function as a communication hub allowing the third device 103 to function as part of the communication path 104 and not limited to be an end point or terminal unit to the communication path 104. The third communication unit 252 can include active and passive components, such as microelectronics or an antenna, for interaction with the communication path 104.

The third communication unit 252 can include a third communication interface 254. The third communication interface 254 can be used for communication between the third communication unit 252 and other functional units in the third device 103. The third communication interface 254 can receive information from the other functional units or can transmit information to the other functional units.

The third communication interface 254 can include different implementations depending on which functional units are being interfaced with the third communication unit 252. The third communication interface 254 can be implemented with technologies and techniques similar to the implementation of the third controller interface 262.

For illustrative purposes, the third device 103 is shown with the partition having the third user interface 256, the third storage unit 264, the third control unit 260, and the third communication unit 252, although it is understood that the third device 103 can have a different partition. For example, the third software 268 can be partitioned differently such that some or all of its function can be in the third control unit 260 and the third communication unit 252. Also, the third device 103 can include other functional units not shown in FIG. 2 for clarity.

The first communication unit 216 can couple with the communication path 104 to send information to the second device 102, the third device 103, or a combination thereof in the first device transmission 208 of the communication path 104. The second device 102 can receive information in the second communication unit 236 from the first device transmission 208. The second device 102 can receive information directly from the first device 101 through the first device transmission 208. In addition, the second device 102 can receive information from the first device 101 through the third device transmission 211 of the communication path 104. The third device 103 can receive information in the third communication unit 252 from the first device transmission 208.

The second communication unit 236 can couple with the communication path 104 to send information to the first device 101, the third device 103, or a combination thereof in the second device transmission 210 of the communication path 104. The first device 101 can receive information in the first communication unit 216 from the second device transmission 210. The first device 101 can receive information directly from the second device 102 through the second device transmission 210. In addition, the first device 101 can receive information from the second device 102 through the third device transmission 211. The third device 103 can receive information in the third communication unit 252 from the second device transmission 210.

The third communication unit 252 can couple with the communication path 104 to send information to the first device 101, the second device 102, or a combination thereof in the third device transmission 211. The first device 101 can receive information in the first communication unit 216 from the third device transmission 211. The second device 102 can receive information in the second communication unit 236 from the third device transmission 211.

The functional units in the first device 101 can work individually and independently of the other functional units. The first device 101 can work individually and independently from the second device 102, the third device 103, and the communication path 104.

The functional units in the second device 102 can work individually and independently of the other functional units. The second device 102 can work individually and independently from the first device 101, the third device 103, and the communication path 104.

The functional units in the third device 103 can work individually and independently of the other functional units. The third device 103 can work individually and independently from the first device 101, the second device 102, and the communication path 104.

The electronic system 100 can be executed by the first control unit 212, the second control unit 234, the third control unit 260, or a combination thereof. For illustrative purposes, the electronic system 100 is described by operation of the first device 101, the second device 102, and the third device 103, although it is understood that the first device 101, the second device 102, and the third device 103 can operate any of the modules and functions of the electronic system 100. For example, the first device 101 is described to operate the first image capture unit 231, although it is understood that the third device 103 can also operate the first image capture unit 231. As an additional example, the third device 103 is described to operate the second image capture unit 241, although it is understood that the third device 103 can also operate the second image capture unit 241.

Figure 3:
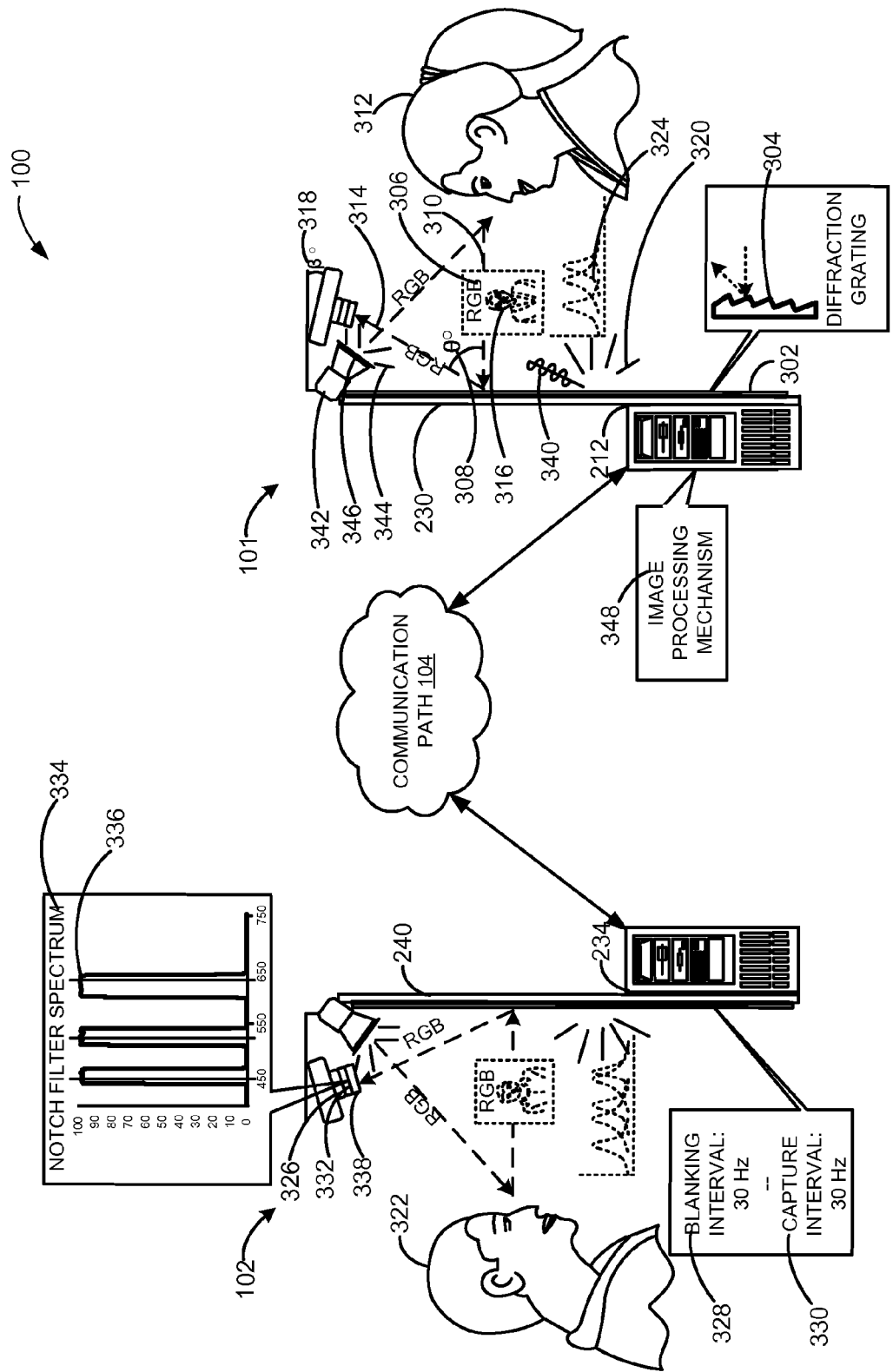
FIG. 3 is an illustrative profile view of the electronic system in operation.

Referring now to FIG. 3, therein is shown an illustrative profile view of the electronic system 100 in operation. The electronic system 100 can include the first device 101, the second device 102, or a combination thereof. As depicted in FIG. 3, the first device 101 can communicate with the second device 102 using the communication path 104. In addition, the first device 101 can also communicate with the second device 102 through the third device 103 of FIG. 1. For illustrative purposes, the electronic system 100 is described by operation of the first device 101, although it is understood that the second device 102 can operate in a similar manner with similar components.

The first device 101 can include a reflective film 302 configured to attach to the first display interface 230. The reflective film 302 is an optically-redirecting polymer layer for reflecting a portion of an incoming light at an angle. The reflective film 302 can reflect the portion of the incoming light through a physical feature of the reflective film 302.

The reflective film 302 can reflect the portion of the incoming light using a diffraction grating 304 of the reflective film 302. The diffraction grating 304 is a periodic or repeating surface feature for separating, reflecting, refracting, or a combination thereof for incident light of different wavelengths. The diffraction grating 304 can be a grooved or gradated pattern on a surface or within the volume of the reflective film 302.

As a more specific example, the reflective film 302 can be an optically-redirecting polymer, with a thickness between 10 and 30 micrometers. The optically-redirecting polymer can be applied to an inert substrate, such as polymethylmethacrylate (PMMA) or polycarbonate (PC), with a thickness between 0.1 and 2 millimeters. For example, the optically-redirecting polymer can be a panchromatic polymer, a holographic polymer, or a combination thereof. As an even more specific example, the optically-redirecting polymer can be a Bayer™ Bayfol film or a Dupont™ Omnidex film.

The reflective film 302 can be attached to the first display interface 230 through a mounting mechanism. The mounting mechanism can include an adhesive, a mechanical attachment, such as a clip, a holder, a bracket, a joint, or a combination thereof. The mounting mechanism can secure the reflective film 302 to another surface. For example, the mounting mechanism can secure the reflective film 302 to a display surface of the first display interface 230. As another example, when the mounting mechanism is an adhesive, the adhesive can be included on a surface of the reflective film 302 opposite the diffraction grating 304.

It has been discovered that attaching the reflective film 302 including the diffraction grating 304 to a display interface, such as the first display interface 230, the second display interface 240, or a combination thereof provides for a cost-effective solution to solving gaze alignment problems pertaining to video communication or conferencing systems. For example, the reflective film 302 can be laminated or affixed directly to or over a screen or surface of the display interface. The reflective film 302 attached to or over the screen or surface can save a display manufacturer from having to retool or change existing manufacturing equipment or processes to solve gaze alignment problems.

It has also been discovered that attaching the reflective film 302 to a display interface provides increased flexibility and scalability for solving gaze alignment problems. For example, the size of the reflective film 302 can be increased or decreased to accommodate a range of display screen dimensions. In addition, the reflective film 302 can be adopted for display interfaces up to and including human-size display interfaces.

The reflective film 302 can include the diffraction grating 304 for reflecting light at a reflection angle 308 according to frequencies or wavelengths corresponding to reflective grating spectra 306. For example, the reflective film 302 can reflect light by maintaining intensities of particular frequencies or wavelengths of light while reducing or eliminating other frequencies or wavelengths. The reflective grating spectra 306 are bandwidths of light selectively reflected by the reflective film 302. The reflective grating spectra 306 can be reflected by the reflective film 302 when the bandwidths of light are deflected by a physical feature of the diffraction grating 304.

As an example, the reflective grating spectra 306 can be deflected by the diffraction grating 304 of the reflective film. The reflective grating spectra 306 can be determined based on a thickness of the reflective film 302, a grating angle of the diffraction grating 304, the spacing of the embedded periodic diffractive structure, a material composition of the reflective film 302, a surface characteristic of the reflective film 302 or the diffraction grating 304, or a combination thereof.

As an example, the reflective grating spectra 306 can be a red, green, and blue (RGB) spectra including a red spectra, a green spectra, and a blue spectra centered around wavelengths of 650 nm, 540 nm, and 450 nm, respectively. In this example, the specific bandwidth of each color spectra can span between 20 nm and 30 nm. As another example, the reflective grating spectra 306 can also be a single band spectra, a dual band spectra, or a quad-band spectra.

The reflective film 302 can reflect an incident light ray 310 at the reflection angle 308. The incident light ray 310 can include light ray approaching the reflective film 302. The incident light ray 310 can emanate, such as by being generated by or being reflected from, with respect to a subject or scene facing the reflective film. For example, the incident light ray 310 can emanate from a first user 312 viewing the first display interface 230. The incident light ray 310 can be reflected by the reflective film 302 at a point of incidence. The point of incidence is a contact point between a light ray and a surface.

The incident light ray 310 can include bandwidths of light corresponding to or within the reflective grating spectra 306 in addition to other bandwidths. The incident light ray 310 can become a reflected light ray 314 when reflected by the reflective film 302. The reflected light ray 314 can include a light ray reflected by the reflective film 302 at the point of incidence. The reflected light ray 314 can include bandwidths of light characteristic of or within the reflective grating spectra 306. The reflected light ray 314 can include or be within the reflective grating spectra 306 characteristic of being reflected by the diffracting grating 304. The reflected light ray 314 can include certain wavelength or bands highlighted relative to other wavelengths characteristic of the diffraction grating 304.

For example, the reflected light ray 314 can include a difference in magnitudes for specific bandwidths of light. As a more specific example, the reflected light ray 314 can include magnitude for specific bandwidths of light maintained with magnitude for other frequencies reduced or attenuated. Also for example, the reflected light ray 314 can include magnitude for specific bandwidths maintained with magnitude for other frequencies amplified.

The reflective film 302 can reflect bandwidths of light corresponding to or within the reflective grating spectra 306 at the reflection angle 308. The reflection angle 308 is an angle formed by the reflected light ray 314 and a line normal to the reflective film 302 at the point of incidence.

The reflective film 304 can reflect light based on the diffraction grating 304. The reflective film 304 can reflect the light at the reflection angle 308 different from an incident angle. The incident angle can include an angle formed by a line normal to the reflective film 304 and an incident light ray travelling into the reflective film 304.

In other examples not shown FIG. 3, the reflection angle 308 can be between 45 degrees and 70 degrees. As another example, the reflection angle 308 can be between 70 degrees and 89 degrees. The reflection angle 308 can be above or below the incident light ray 310 depending on the diffraction grating 304 of the reflective film 302. In addition, the reflection angle 308 can be above or below the incident light ray 310 depending on an orientation 318 of the reflective film 302 relative to the first display interface 230.

As a more specific example, the reflective film 304 can be configured to reflect light including light corresponding to or within the reflective grating spectra 306 at the reflection angle 308. The reflective film 304 can be a vertical plane attached to a display interface and the reflective film 304 can reflect light at the reflection angle 308 in a direction different from an incoming direction of the incident light ray 310 or a line normal to the reflective film 304. The reflective film 304 can reflect the reflected light ray 314 including light corresponding to or within the reflective grating spectra 306 by reflecting specific frequencies or bandwidths of light at the reflection angle 308 according to the reflective grating spectra 306 to the first image capture unit 231.

The device orientation 318 is a positioning of one component of a device relative to another component of the device. The device orientation 318 can be for positioning the first image capture unit 231 relative to the reflective film 302. The device orientation 318 can include an angle, a direction, a location, a proximity, or a combination thereof. As a more specific example, the reflection angle 308 of one instance of the reflective film 302 can be 70 degrees below the incident light ray 310.

The reflective film 302 can reflect an image 316 at the reflection angle 308. The image 316 is a visual representation of a subject or scene based on or including light rays emanating from the subject or scene. The image 316 can include bandwidths of light corresponding to or within the reflective grating spectra 306. For example, the image 316 can include a visual representation of the first user 312.

The reflective film 302 can reflect the image 316 by reflecting bandwidths of light making up the image 316. The reflective film 302 can also reflect the image 316 by reflecting the bandwidths making up the image 316 and corresponding to or within the reflective grating spectra 306. The reflective film 302 can reflect the bandwidths of light making up the image 316 at the reflection angle 308.

The first device 101 can include the first image capture unit 231 positioned at an instance of the device orientation 318 to capture the image 316 reflected from the reflective film 302 at the reflection angle 308. The first image capture unit 231 can capture the reflected light ray 314 through a lens 326. For example, the first image capture unit 231 can be positioned at an angle representing the device orientation 318 to align with the reflection angle 308.

The device orientation 318 of the first image capture unit 231 can be fixed relative to the reflective film 302, the first display interface 230, or a combination thereof. For example, the lens 326 of the first image capture unit 231 can be positioned at a fixed angle, a fixed distance, or a combination thereof to the reflective film 302.

In addition, the device orientation 318 of the first image capture unit 231 can be dynamically adjusted by the first control unit 212 of FIG. 2, the second control unit 234 of FIG. 2, the third control unit 260 of FIG. 2, or a combination thereof. The first control unit 212 can dynamically adjust the image capture unit 231 by adjusting an angle or a position of the lens 326 of the first image capture unit 231. The first control unit 212 can adjust the device orientation 318 of the first image capture unit 231 in response to a change in the device orientation 318 of the first display interface 230 such as a change in a tilt or a swivel of the first display interface 230.

The reflective film 302 can also reflect the image 316 while passing a display light 320 from the first display interface 230 with minimal interference or distortion. The display light 320 can include visible light generated by a display interface. The display light 320 can be generated by the first display interface 230 for depicting subjects or scenes captured by another device in the electronic system 100 such as the second device 102.

For example, the display light 320 can be generated by the first display interface 230 for depicting an image of a second user 322 viewing the second display interface 240. In this example, the first display interface 240 can display the image 316 of the second user 322 while the reflective film 302 attached to the first display interface 240 reflects the incident light ray 310 emanating from the first user 312. As a more specific example, the reflective film 302 attached to the first display interface 240 can pass the display light 320 corresponding to the image 316 of the second user 322 while reflecting the incident light ray 310 from the first user 312. The first control unit 212, the second control unit 234, the third control unit 260, or a combination thereof can first identify the display light 320 within the display spectra 324 being displayed on the first display interface 230, the second display interface 240, or a combination thereof coupled to the reflective film 302.

The display light 320 can include or be within a display spectra 324. The display spectra 324 can include bandwidths of light emitted by a display interface. The reflective film 302, including the diffraction grating 304 of the reflective film 302, can be selected to separate the reflective grating spectra 306 from the display spectra 324. The reflective film 302 can separate the reflective grating spectra 306 from the display spectra 324 by minimizing the amount of overlap between the reflective grating spectra 306 and the display spectra 324.

The reflective film 302 can separate the reflective grating spectra 306 from the display spectra 324 by not reflecting light corresponding to the display spectra 324 to the first image capture unit 231, by passing the display spectra 324 different from the reflective grating spectra 306, or a combination thereof. The first display interface 230, the second display interface 240, or a combination thereof can also be covered with an anti-reflective coating to prevent the first user 312, the second user 322, or a combination thereof from seeing their own reflections on a display screen.

In one embodiment, the first control unit 212, the second control unit 234, the third control unit 260, or a combination thereof can also synchronize a blanking interval 328 of the first display 230 with a frame capture interval 330 of the first image capture unit 231. The blanking interval 328 is a frequency with which a display generates an opaque or monochromatic graphic. The blanking interval 328 can be the frequency with which the first display interface 230 generates the opaque or monochromatic graphic.

The frame capture interval 330 is a frequency with which an image capture unit captures a frame of an image. The frame capture interval 330 can be the frequency with which the first image capture unit 231 captures the image 316 reflected by the reflective film 302. The frame capture interval 330 can include a shutter speed, an exposure time, a capture rate, or a combination thereof of a camera or sensor. For example, the blanking interval 328 and the frame capture interval 330 can be 30 Hz or above.

The electronic system 100 can synchronize the blanking interval 328 with the frame capture interval 330 by equating a frequency of the blanking interval 328 with the frequency of the frame capture interval 330. The electronic system 100 can also synchronize the blanking interval with the frame capture interval 330 for ensuring the first image capture unit 231, the second image capture unit 241, or a combination thereof capture the image 316 reflected by the reflective film 302 when the display light 320 is minimized or extinguished. Moreover, the electronic system 100 can synchronize the blanking interval 328 with the frame capture interval 330 for preventing the first image capture unit 231 or the second image capture unit 241 from capturing light rays corresponding to the display spectra 324 along with light rays corresponding to or within the reflective grating spectra 306.

The first device 101 can include a notch filter 332 configured to attach to the first image capture unit 231. As an example, the notch filter 332 can attach to the lens 326 of the first image capture unit 231. The notch filter 332 is a band-pass filter for selectively passing one or more bandwidths of light while attenuating all other wavelengths. Examples of the notch filter 332 include a one-band notch filter, a two-band notch filter, a three-band notch filter, or a four-band notch filter.

The notch filter 332 can filter out the display light 320 of the first display interface 230 from the image 316 based on a notch filter spectra 334 corresponding to or within the reflective grating spectra 306. The notch filter spectra 334 are bandwidths of light passed by the notch filter 332. The notch filter spectra 334 can be the three-band spectra including the RGB spectra. The notch filter 332 can filter out the display light 320 by passing frequencies according to a pass band corresponding to the notch filter spectra 334.

As an example, the notch filter spectra 334 can include the red spectra, the green spectra, and the blue spectra centered around wavelengths of 650 nm, 540 nm, and 450 nm, respectively. In this example, the specific bandwidth of each color spectra can span between 20 nm and 30 nm. In other examples, the notch filter spectra 334 can also be the single band spectra, the dual band spectra, or the quad-band spectra. The notch filter 332 can be selected based on peak wavelengths 336 of the notch filter spectra 334 aligning with the peak wavelengths 336 of the reflective grating spectra 306.

The first device 101 can also include a polarizer 338 to attach to the first image capture unit 231. As an example, the polarizer 338 can attach to the lens 326 or the notch filter 332 of the first image capture unit 231. The polarizer 338 is a filter for absorbing a polarized light 340 emitted by a display interface. The polarizer 338 can be a filter for absorbing the polarized light 340 included as part of the display light 320 generated by the first display interface 230.

The polarizer 338 can include a linear polarizer, a circular polarizer, or a combination thereof. As an example, the polarizer 338 can be the linear polarizer and the first device 101 can use the linear polarizer to filter out linearly-polarized light generated by liquid crystal display (LCD) and organic light-emitting diode (OLED) display interfaces.

As another example, the filtering capabilities of the polarizer 338, the notch filter 332, or a combination thereof can be integrated into a photo-sensor of the first image capture unit 231. As a more specific example, a color filter array, including a Bayer filter, of a charge-coupled device (CCD) of the first image capture unit 231 can be adjusted to match the peak wavelengths 336 of the reflective grating spectra 306.

In addition, the lens 326 of the first image capture unit 231 can be a perspective control lens, such as a tilting lens, a shifting lens, an anamorphic lens, or a combination thereof. For example, the image 316 reflected from the reflective film 302 and captured by the first image capture unit 231 can be subject to distortions including being vertically compressed or foreshortened when the reflection angle 308 exceeds 45 degrees. In this example, the first image capture unit 231 can use the anamorphic lens to optically correct any distortions caused by the size of the reflection angle 308.

The electronic system 100 can also include a light source 342 for illuminating a subject or scene. The light source 342 can illuminate the subject or scene for increasing the amount of light rays emanating from the subject or scene. The light source 342 can increase the amount of light rays emanating from the subject or scene for optimizing the image 316 of the subject or scene. For example, the light source 342 can optimize the image 316 of the first user 312 by illuminating the first user 312 with additional light rays generated by the light source 342.

The light source 342 can include a continuous light source or a pulsed light source. Examples of the light source 342 include a light-emitting diode (LED) device, a laser device, a projection device, or a combination thereof. As an example, the light source 342 can include an OLED, an active-matrix organic light emitting diode (AMOLED), a picosecond laser, or a combination thereof. As an example, the light source 342 can be an RGB LED coupled to the first display interface 231.

The light source 342 can generate an illumination light 343 including an illumination spectra 344. The illumination spectra 344 are bandwidths of light emitted by the light source 342. The illumination spectra 344 can be the three-band spectra including the RGB spectra.

As a more specific example, the illumination spectra 344 can include wavelengths associated with the color red, the green, and the blue centered around wavelengths of 650 nm, 540 nm, and 450 nm, respectively. In this example, the specific bandwidth of each color spectra can span between 20 nm and 30 nm. In other examples, the illumination spectra 344 can also be a single band spectra, a dual band spectra, or a quad-band spectra.

The light source 342 can be selected based on the peak wavelengths 336 of the illumination spectra 344 aligning with the peak wavelengths 336 of the reflective grating spectra 306, the notch filter spectra 334, or a combination thereof. In an alternative example not shown in FIG. 3, the light source 342 can pass light through an instance of the notch filter 332 configured to attach to the light source 342. In this example, the light source 342 can use the notch filter 332 to align the peak wavelengths 336 of the illumination spectra 344 with the peak wavelengths 336 of the reflective grating spectra 306.

As depicted in FIG. 3, the light source 342 can be positioned above the first display interface 230. In other examples not depicted in FIG. 3, the light source 342 can be positioned at other portions of the first display interface 230 including a bottom portion, a corner, a left side, a right side, or a combination thereof. The light source 342 can also be positioned to face the subject or scene and to emit the illumination light 343 corresponding to or within the illumination spectra 344 away from the reflective film 302.

The light source 342 can direct the illumination light 343 corresponding to or within the illumination spectra 344 at the first user 312 for augmenting or enhancing the amount of light reflected off of the first user 312. For example, the light source 342 can direct the illumination light 343 corresponding to or within the illumination spectra 344 at the first user 312 for increasing the amount of the incident light ray 310 emanating from the first user 312. As a more specific example, the light source 342 can direct the illumination light 343 corresponding to or within the illumination spectra 344 at the first user 312 for increasing the amount of light corresponding to or within the reflective grating spectra 306 reflected off of the first user 312.

The light source 342 can also include a diffusing component 346. The diffusing component 346 can be a filter or lens for reducing an intensity of light emitted from the light source 342. The diffusing component 346 can be coupled to the light source 342 or positioned in between the light source 342 and a subject or scene illuminated by the light source 342. The diffusing component 346 can be positioned so light emanating from the light source 342 impinge orthogonally on a surface of the diffusing component 346.

The diffusing component 346 can include a diffusion filter, a glass-based diffuser such as a ground glass diffuser or a greyed glass diffuser, a polymer-based diffuser, or a combination thereof. For example, the diffusing component 346 can be positioned between the light source 342 and the first user 312 for reducing a discomfort of the first user 312 from direct illumination.

The electronic system 100 can apply an image processing mechanism 348 to the image 316 captured by the first image capture unit 231, the second image capture unit 241, or a combination thereof. The electronic system 100 can apply the image processing mechanism 348 to the image 316 for processing the image 316 reflected from the reflective film 302 at the reflection angle 308 and captured by the first image capture unit 231, the second image capture unit 241, or a combination thereof at the device orientation 318 aligned with the reflection angle 308.

The image processing mechanism 348 is a method or process for correcting or enhancing an image captured by an image capture unit through any combination of digital, analog, or optical techniques. The image processing mechanism 348 can include digital signal processing, analog signal processing, optical manipulations, or a combination thereof.

The electronic system 100 can use the first control unit 212, the second control unit 234, the third control unit 260, or a combination thereof to apply the image processing mechanism 348 to the image 316 captured by the first image capture unit 231, the second image capture unit 241, or a combination thereof. For example, the image processing mechanism 348 can be a digital signal processing technique such as a pixel-based processing algorithm, gradient domain image processing algorithm, or a combination thereof. As a more specific example, the image processing mechanism 348 can include an image resizing technique, an image sharpening algorithm, a perspective distortion correction technique such as a vertical or horizontal correction technique, a raster-based interpolation technique, or a combination thereof.

The first control unit 212, the second control unit 234, the third control unit 260, or a combination thereof can apply the image processing mechanism 348 to the image 316 by separating the image 316 from the display light 320 based on the display spectra 324, the reflective grating spectra 306, or a combination thereof. As an example, the image processing mechanism 348 can include frequency filtering algorithms including a notch filtering algorithm to filter out the display light 320 of the first display interface 230 from the image 316 based on frequencies corresponding to the notch filter spectra 334. As a further example, the image processing mechanism 348 can eliminate or cancel contributions or influences from one instance of the image 316 displayed on a display interface from another instance of the image 316 captured by the first image capture unit 231 or the second image capture unit 241.

The electronic system 100 can apply the image processing mechanism 348 to the image 316 reflected by the reflective film 302 and captured by the first image capture unit 231, the second image capture unit 241, or a combination thereof. The electronic system 100 can apply the image processing mechanism 348 to the image 316 to remove a distortion caused by a height of the reflection angle 308. For example, the first control unit 212, the second control unit 234, the third control unit 260, or a combination thereof can apply a raster-based interpolation technique to the image 316 by inversely mapping the image 316 onto a three-dimensional computer graphic geometry.

In addition, the first control unit 212, the second control unit 234, the third control unit 260, or a combination thereof can apply the image processing mechanism 348 including a vertical re-sizing algorithm to the image 316 to correct a vertical compression of the image 316 due to the reflection angle 308 exceeding 45 degrees. Moreover, the first control unit 212, the second control unit 234, the third control unit 260, or a combination thereof can apply the image processing mechanism 348 including a digital signal processing technique to remove artifacts incorporated into the image 316.

Once the first control unit 212, the second control unit 234, the third control unit 260, or a combination thereof has applied the image processing mechanism 348 to the image 316, the electronic system 100 can use the first communication unit 216 of FIG. 2 to send the image 316 to the second device 102 over the communication path 104. For example, the electronic system 100 can use the first communication unit 216 to send the image 316 to the second communication unit 236 of FIG. 2. The electronic system 100 can communicate the image 316 corresponding to or within the reflective grating spectra 306 directly between end user devices, such as between the first device 101 and the second device 102. The system 100 can further communicate the image 316 through other devices, such as using the third device 103, a router, a repeater, a server, a gateway, a service provider, or a combination thereof.

The electronic system 100 can then use the second display interface 240 to display the image 316 of the first user 312 to the second user 322. The electronic system 100 can display the image 316 of the first user 312 while using the reflective film 302 attached to the second display interface 240 to reflect the incident light ray 310 emanating from the second user 322 to the second image capture unit 241.

The electronic system 100 can then use the second control unit 234 to apply the image processing mechanism 348 to the image 316 of the second user 322 captured by the second image capture unit 241. After the second control unit 234 has applied the image processing mechanism 348 to the image 316 of the second user 322, the electronic system 100 can use the second communication unit 236 to send the image 316 of the second user 322 to the first device 101 through the communication path 104.

It has been discovered that reflecting the image 316 within the reflective grating spectra 306 at the reflection angle 308 and capturing the image 316 reflected from the reflective film 302 with an image capture unit at the device orientation 318 provides for an improved user experience by allowing the first user 312 and the second user 322 to make direct eye-contact with one another through the first display interface 230 and the second display interface 240. Current video-conferencing or video communications systems often rely on a video camera mounted on a top or bottom bezel of a display screen of the video communications system to capture a top-down elevational view or a bottom-up elevational view of a user. However, embodiments of the present invention, can allow the first user 312 and the second user 322 to make direct eye contact with one another by aligning a gaze of the first user 312 with a gaze of the second user 322.

For example, the first user 312 can look at the image 316 of the second user 322 displayed on the first display interface 230 while the first image capture unit 231 captures the image 316 of the first user 312 from the perspective of the screen of the first display interface 230 using the reflective film 302 covering the first display interface 230. In this example, the second user 322 can also look at the image 316 of the first user 312 displayed on the second display interface 240 while the second image capture unit 241 captures the image 316 of the second user 322 reflected from the reflective film 302 covering the second display interface 240. The gaze of the first user 312 can be aligned with the gaze of the second user 322 when the first user 312 looks at the eyes of the second user 322 displayed on the first display interface 230 while the second 322 looks at the eyes of the first user 312 displayed on the second display interface 240.

Moreover, while direct eye contact can be simulated when the user directs his or her gaze at the camera directly, this results in the user being unable to comfortably view the other user on the display screen. The electronic system 100 provides the first user 312 with the ability to make direct eye contact with the second user 322 displayed on the first display interface 230 while comfortably viewing the image 316 of the second user 322 displayed on the first display interface 230. Thus, unlike other video communications systems, the electronic system 100 provides a user experience similar to an in-person meeting.

It has been discovered that the notch filter 332 and the diffraction grating 304 of the reflective film 302 improves the clarity and color of the image 316. These improvements can be based on separating the display light 320 from the reflected light ray 314 captured by the first image capture unit 231, the second image capture unit 241, or a combination thereof. For example, the diffraction grating 304 can ensure light rays corresponding to or within the reflective grating spectra 306, and not light rays in the display spectra 324, are reflected by the reflective film 302 and the notch filter 332 can ensure that light rays within the notch filter spectra 334, and not light rays in the display spectra 324, are captured by the first image capture unit 231, the second image capture unit 241, or a combination thereof.

It has been discovered that covering a display interface such as the first display interface 230, the second display interface 240, or a combination thereof with the reflective film 302 and attaching the notch filter 332 to an image capture unit such as the first image capture unit 231, the second image capture unit 241, or a combination thereof provides for a more efficient and less intrusive system for aligning a gaze of the first user 312 with a gaze of the second user 322. For example, the reflective film 302 can be laminated to the first display interface 230 or the second display interface 240 and the notch filter 332 can be easily attached to the lens 326 of the first image capture unit 231 or the second image capture unit 241. Unlike other video communications systems which utilize bulky beam splitters and half-silvered mirrors, the components of the electronic system 100 are lightweight, portable, and take advantage of existing device hardware and software capabilities.

Figure 4:
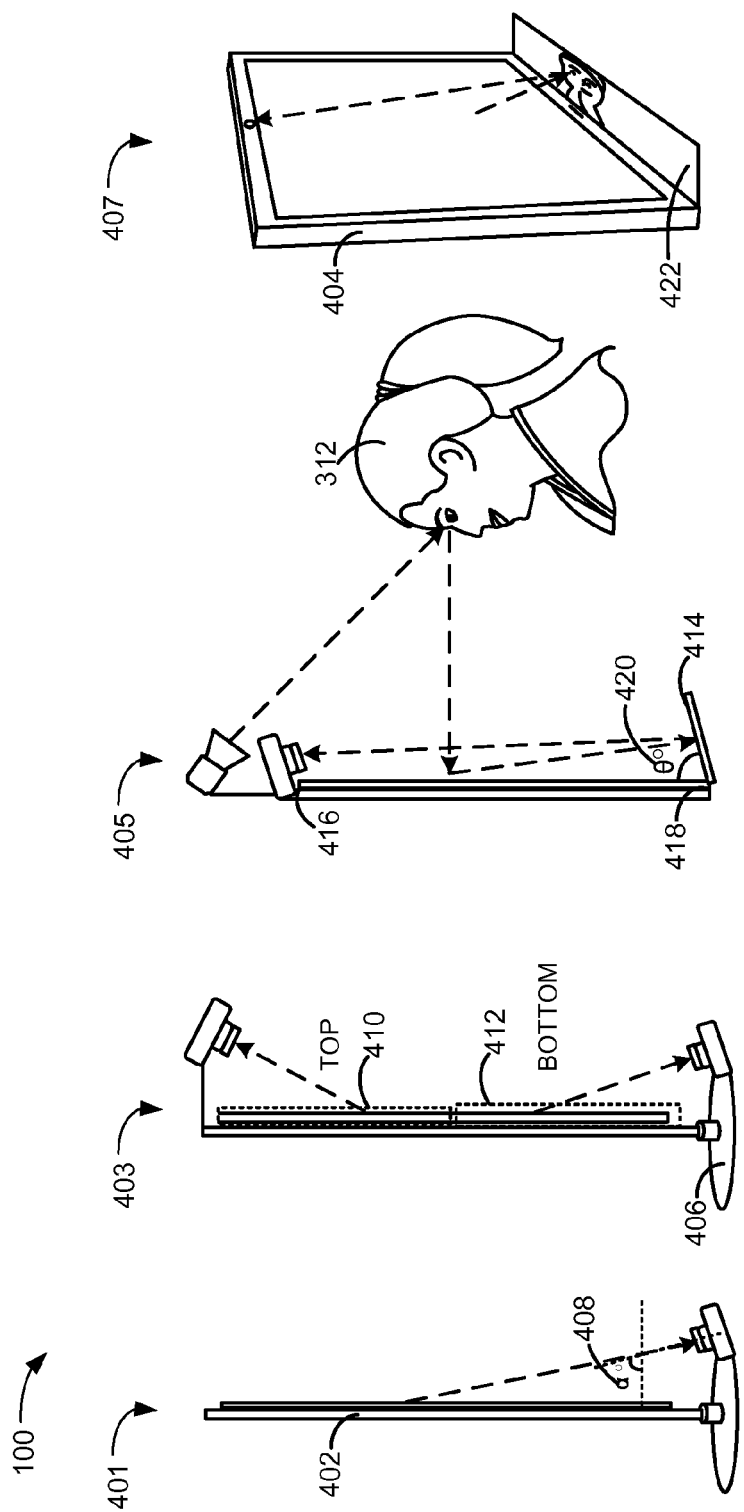
FIG. 4 is a profile view of further exemplary embodiments of the electronic system.

Referring now to FIG. 4, therein is shown a profile view of further exemplary embodiments of the electronic system 100. As exemplified by a first embodiment 401, the first image capture unit 231 of FIG. 2 can be coupled to a support structure 402. The support structure 402 can be included in the first display interface 230 of FIG. 2. The support structure 402 can include a frame 404, a base stand 406, or a combination thereof of the first display interface 230. The support structure 402 can further include a mount or an adapter for attaching the reflective film 302 of FIG. 3, the first image capture unit 231, or a combination thereof to the first display interface 230.

As depicted in the first embodiment 401 of FIG. 4, the first image capture unit 231 can be coupled to the base stand 406 of the first display interface 230. In this example, the lens 326 of FIG. 3 of the first image capture unit 231 can be directed toward the first display interface 230 at an upward capture angle 408. The upward capture angle 408 is an angle formed by a line normal to the lens 326 of the first image capture unit 231 and a line normal to the reflective film 302 of FIG. 3. For example, the upward capture angle 408 can be between 45 degrees and 89 degrees.

Also, in this example, the reflective film 302 affixed to the first display interface 230 can be oriented so the light rays reflected by the reflective film 302 are directed at a downward instance of the reflection angle 308 of FIG. 3 toward the lens 326 of the first image capture unit 231. As another example, the diffraction grating 304 of FIG. 3 of the reflective film 302 can be selected to reflect light rays at a downward instance of the reflection angle 308.

In other examples not depicted in FIG. 4, the first image capture unit 231 can be coupled to other portions of the frame 404 including a corner, a left side, or a right side of the frame 404. In these examples, the reflective film 302 can be oriented or the diffraction grating 304 can be chosen to reflect light rays toward the lens of the first image capture unit 231.

As exemplified by a second embodiment 403, multiple instances of the reflective film 302 can cover or be affixed to one instance of a display interface. For example, multiple instances of the reflective film 302 can cover the first display interface 230. The first display interface 230 can be divided into multiple display regions. For example, as depicted in FIG. 4, the first display interface 230 can be divided into an upper display region 410 and a lower display region 412.

Each of the display regions can be covered with a different instance of the reflective film 302. Moreover, each instance of the reflective film 302 can include a different instance of the reflection angle 308. For example, as depicted in FIG. 4, one instance of the reflective film 302 can be attached to the upper display region 410 and can reflect light rays between 45 and 89 degrees above the line normal to the point of incidence. In this example, another instance of the reflective film 302 can be attached to the lower display region 412 can reflect light rays between 45 and 89 degrees below the line normal to the point of incidence.

The first device 101 can include multiple instances of the first image capture unit 231 for capturing light rays reflected from different instances of the reflective film 302. For example, as depicted in FIG. 4, one instance of the first image capture unit 231 can be coupled to the base stand 406 and another instance of the first image capture unit 231 can be coupled to an upper portion of the frame 404 through an extension arm.

Each instance of the first image capture unit 231 can be positioned to capture light rays reflected by a corresponding instance of the reflective film 302. As a more specific example, one implementation of the first image capture unit 231 coupled to the upper portion of the frame 404 can be used to capture light rays reflected from the reflective film 302 attached to the upper display region 410. As another example, the first image capture unit 231 or a further implementation thereof coupled to the lower portion of the frame 404 can be used to capture light rays reflected from the reflective film 302 attached to the lower display region 412.

As exemplified by a third embodiment 405, the electronic system 100 can include a mirror 414 positioned at a first edge 416 of the reflective film 302. The mirror 414 can include a physical surface for reflecting light rays from the reflective film 302. The mirror 414 can reflect all visible wavelengths of light or one or more specific wavelength of light. The mirror 414 can include a plane mirror, a curved mirror such as a concave mirror or parabolic mirror, or a combination thereof. The mirror 414 can also be a metallic mirror, a glass-based mirror, or a combination thereof.

The first edge 416 of the reflective film 302 can be opposite to a second edge 418 of the reflective film 302 coupled to the first image capture unit 231. As an example, the first edge 416 can be a bottom edge of the reflective film 302 and the second edge 418 can be a top edge of the reflective film 302. As another example, the first edge 416 can be a top edge of the reflective film 302 and the second edge 418 can be a bottom edge of the reflective film 302.

The mirror 414 can form a mirroring angle 420 with the reflective film 302. The mirroring angle 420 is an angle formed by the mirror 414 and a surface of the reflective film 302 with reflective properties. The mirroring angle 420 can be between 45 degrees and 70 degrees. The mirroring angle 420 can be any acute angle including between 70 degrees and 89 degrees.

The reflective film 302 can reflect light rays, including bandwidths of light corresponding to or within the reflective grating spectra 306 of FIG. 3, to the mirror 414. For example, the reflective film 302 can reflect the image 316 to the mirror 414. As a more specific example, the reflective film 302 can reflect the image 316 of the first user 312 to the mirror 414.

The mirror 414 can reflect the light rays received from the reflective film 302 to the first image capture unit 231. For example, the mirror 414 can reflect the image 316 received from the reflective film 302 to the first image capture unit 231. As a more specific example, the mirror 414 can reflect the image 316 of the first user 312 to the first image capture unit 231 at the mirroring angle 420.

The reflective film 302 can reflect the image 316 to the mirror 414 to lengthen an image capture distance between the first image capture unit 231 and the reflective film 302. The mirror 414 can lengthen the image capture distance between the first image capture unit 231 and the reflective film 302 to ensure light rays reflecting off portions of the reflective film 302 near the first image capture unit 231 are not distorted by their proximity to the first image capture unit 231. In addition, the mirror 414 can serve as a polarizing filter to filter out the display light 320 of FIG. 3 generated by the first display interface 230.

The first image capture unit 231 can be configured to capture the light rays reflected from the mirror 414. The first image capture unit 231 can capture the light rays reflected from the mirror 414 according to the device orientation 318 of FIG. 3 of the first image capture unit 231 with the mirroring angle 420. For example, the lens 326 of the first image capture unit 231 can be positioned or adjusted to face the mirror 414. Also, for example, the mirroring angle 420 can be positioned to allow the light rays reflected from the mirror 414 to reach the lens 326 of the first image capture unit 231.

The mirror 414 can be coupled to the support structure 402 of the first display interface 230. For example, the mirror 414 can be coupled directly to the frame 404 of the first display interface 230. As exemplified by a fourth embodiment 407, the mirror 414 can be coupled to a lower bezel of the first display interface 230. In this example, the first image capture 231 can be a camera embedded in an upper bezel of the first display interface 230. As another example not shown in FIG. 4, the mirror 414 can be coupled to the upper bezel of the first display interface 230 and the first image capture unit 231 can be coupled to the lower bezel of the first display interface 230, or along opposing sides on the horizontal ends of the display.

The mirror 414 can also be coupled to the first display interface 230 through a tray component 422. The tray component 422 is a structural support coupled to an edge of a display interface for supporting or holding a reflective component. The tray component 422 can be a structural support for holding the mirror 414. The tray component 422 can also position the mirror 414 at the mirroring angle 420.

The tray component 422 can be configured to detach from the support structure 402 of the first display interface 230. In addition, the tray component 422 can also be configured to retract into the support structure 402 of the first display interface 230. For example, the tray component 422 can be pulled out from the lower bezel of the first display interface 230 to position the mirror 414 at the mirroring angle 420.

Moreover, the tray component 422 can be configured to fold into or away from the support structure 402 of the first display interface 230. For example, the tray component 422 can be a folding tray coupled to the lower bezel of the first display interface 230 through a hinge mechanism. In this example, the tray component 422 can position the mirror 414 at the mirroring angle 420 when the tray component 422 is folded down. The tray component 422 can reveal the mirror 414 when the first user 312 desires to use the first display interface 230 for video chatting or conferencing purposes. The tray component 422 can hide the mirror 414 when the first user 312 desires to only use the first display interface 230 to view content.

In an example not shown in FIG. 4, an additional instance of the reflective film 302 can be attached to the tray component 422 in addition to or in lieu of the mirror 414. The reflective film 302 attached to the tray component 422 can reflect the light rays received from the reflective film 302 attached to the first display interface 230. Moreover, the reflective film 302 attached to the tray component 422 can reflect the light rays corresponding to the image 316 toward the first image capture unit 231. In this example, the reflective film 302 attached to the tray component 422 can serve as an additional filtering mechanism for the reflective grating spectra 306.

In another example not shown in FIG. 4, multiple instances of the mirror 414 or the reflective film 302 can be attached to the tray component 422 to form a lenslet array. The lenslet array can be configured to reflect the light rays received from the reflective film 302 attached to the first display interface 230 toward one or more instances of the first image capture unit 231. In this example, the electronic system 100 can include the lenslet array for introducing parallax, refocusing, or other light-field effects in the image 316 captured by the one or more instances of the first image capture unit 231.

In addition, the electronic system 100 can apply the image processing mechanism 348 of FIG. 3 to the image 316 reflected by the mirror 414 and captured by the first image capture unit 231, the second image capture unit 241, or a combination thereof. The electronic system 100 can apply the image processing mechanism 348 to the image 316 to remove a distortion caused by a height of the mirroring angle 420.

Figure 5:
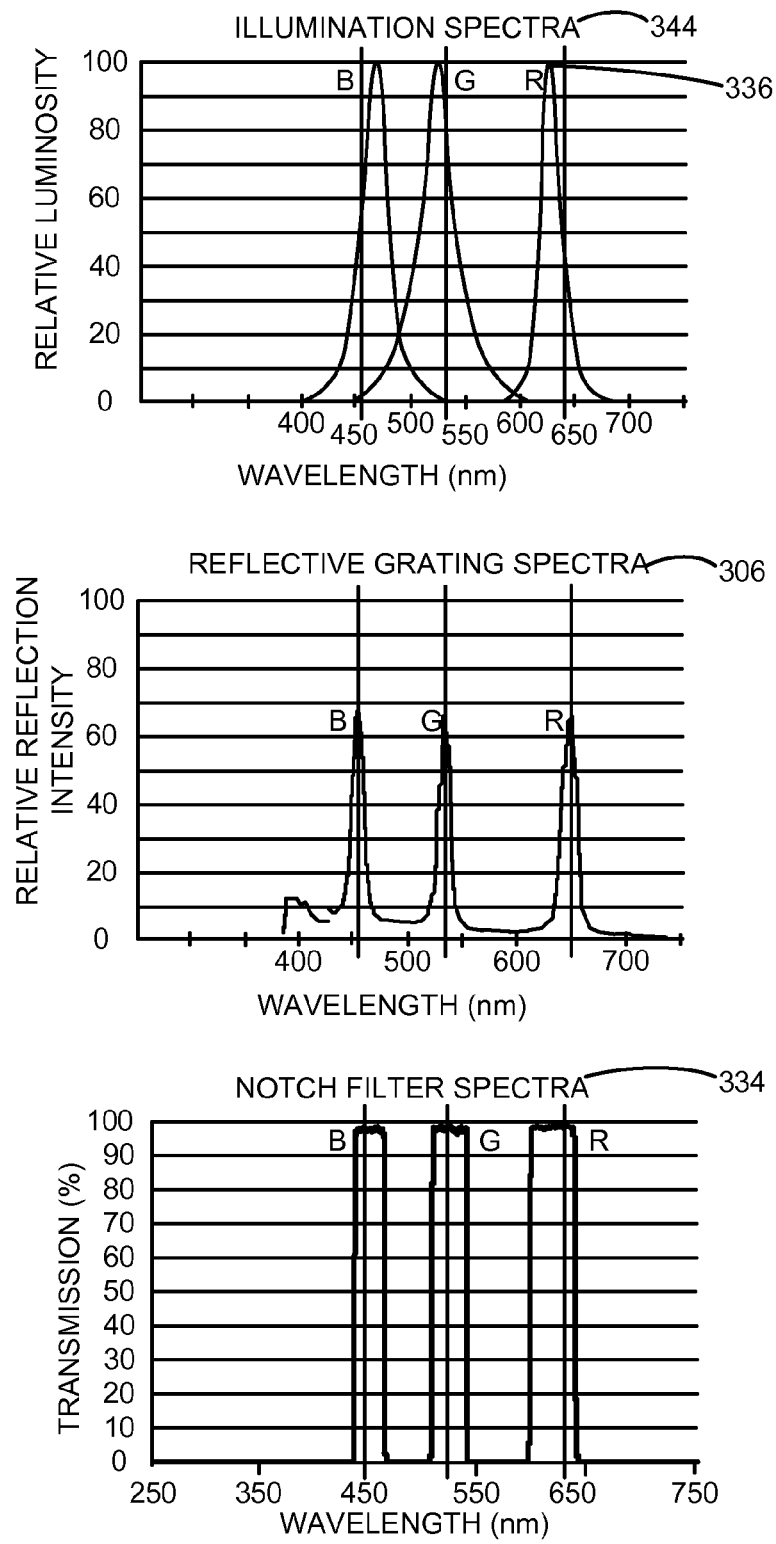
FIG. 5 is an exemplary illustration of various spectra of the electronic system.

Referring now to FIG. 5, therein is shown an exemplary illustration of various spectra of the electronic system 100 of FIG. 1. For illustrative purposes, FIG. 5 depicts the illumination spectra 344, the reflective grating spectra 306, and the notch filter spectra 334.

As previously discussed, the illumination spectra 344 are bandwidths of light emitted by the light source 342 of FIG. 3. The reflective grating spectra 306 are bandwidths of light selectively reflected by the reflective film 302 of FIG. 3. The notch filter spectra 334 are bandwidths of light passed by the notch filter 332 of FIG. 3.

As depicted in FIG. 5, in an exemplary embodiment, the illumination spectra 344, the reflective grating spectra 306, the notch filter spectra 334, or a combination thereof can include a narrow bandwidth corresponding to red light centered around 650 nm, a narrow bandwidth corresponding to green light centered around 540 nm, and a narrow bandwidth corresponding to blue light centered around 450 nm. As an example, the size of each bandwidth can span between 20 nm and 30 nm.

For illustrative purposes, the illumination spectra 344, the reflective grating spectra 306, and the notch filter spectra 334 are depicted as a three-band spectra, although it is understood that the illumination spectra 344, the reflective grating spectra 306, the notch filter spectra 334, or a combination thereof can include any number of bands. For example, the illumination spectra 344, the reflective grating spectra 306, and the notch filter spectra 334 can include a dual-band spectra or a quad-band spectra.

The light source 342 and the notch filter 332 can be selected so the peak wavelengths 336 of the illumination spectra 344 and the notch filter spectra 334, respectively, align with the peak wavelengths 336 of the reflective grating spectra 306. The light source 342 can also augment or increase an amount of the incident light ray 310 corresponding to wavelengths of light included in the reflective grating spectra 306.

In addition, the notch filter 332 can be coupled to the first image capture unit 231 of FIG. 2, the second image capture unit 241 of FIG. 2, or a combination thereof to separate the reflected light ray 314 of FIG. 3 from the display light 320 of FIG. 3. For example, the notch filter 332 can separate the reflected light ray 314 carrying the image 316 of FIG. 3 from the display light 320 of the first display interface 230 of FIG. 2 by allowing only light included in the notch filter spectra 334 to pass to the first image capture unit 231.

In addition, the reflective film 302, the light source 342, the notch filter 332, or a combination thereof can be selected based on the bandwidths of the display spectra 324 of FIG. 3 generated by a display interface such as the first display interface 230, the second display interface 240 of FIG. 2, or a combination thereof. For example, the reflective film 302 can be selected based on an amount of overlap between the reflective grating spectra 306 of the reflective film 302 and the display spectra 324. In this example, the reflective film 302 can be selected to minimize the amount of overlap between the reflective grating spectra 306 and the display spectra 324.

As an additional example, the light source 342 can be selected based on the amount of overlap between the illumination spectra 344 of the illumination light 343 generated by the light source 342 and the display spectra 324. Also, in this example, the light source 342 can be selected to minimize the amount of overlap between the illumination spectra 344 and the display spectra 324. As another example, the notch filter 332 can be selected based on the amount of overlap between the notch filter spectra 334 of the notch filter 332 and the display spectra 324. In this example, the notch filter 332 can be selected to minimize the amount of overlap between the notch filter spectra 334 and the display spectra 324.

Figure 6:
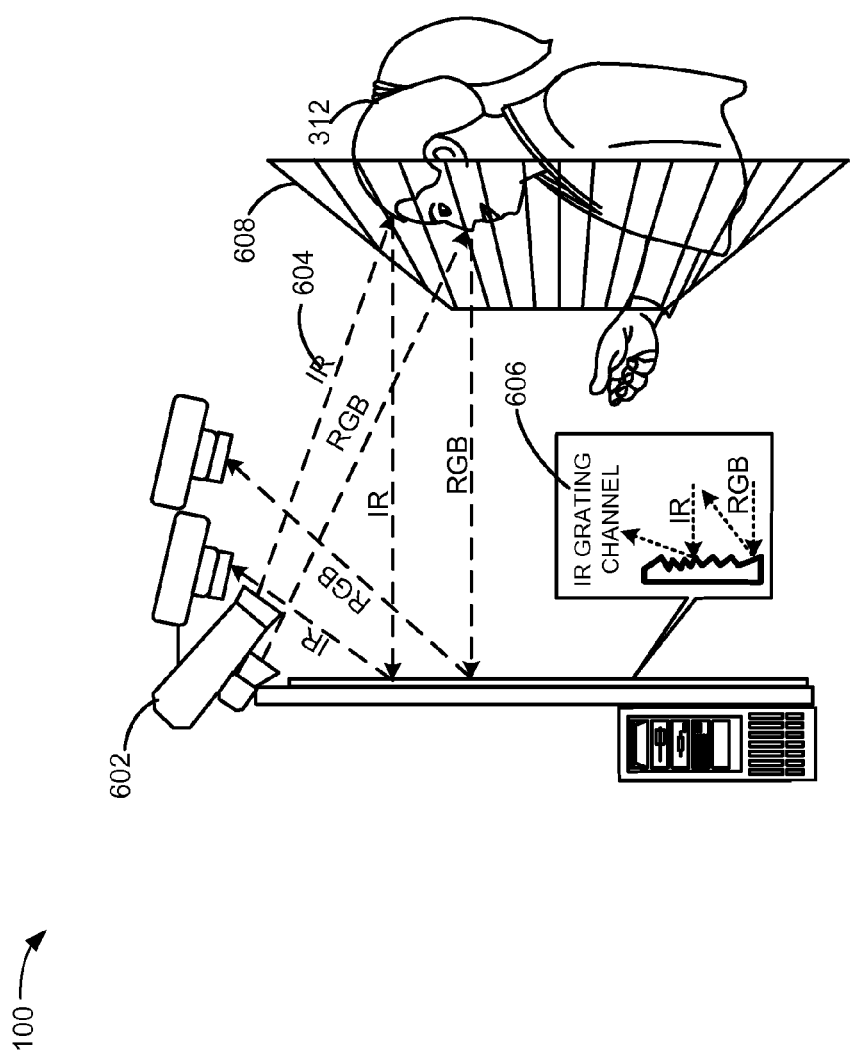
FIG. 6 is an illustration of additional exemplary embodiments of the electronic system.

Referring now to FIG. 6, therein is shown an illustration of additional exemplary embodiments of the electronic system 100 of FIG. 1. For illustrative purposes, the device is depicted as the first device 101, although it is understood that the device can also be the second device 102 of FIG. 1.

As depicted in FIG. 6, the electronic system 100 can include an infrared projector 602. The infrared projector 602 can generate an infrared emission 604 falling within an infrared (IR) or near-infrared (NIR) spectral range. As an example, the infrared emission 604 can include wavelengths of light between 700 nm and 1 mm. The infrared projector 602 can generate the infrared emission 604 in conjunction with the light source 342 generating the illumination spectra 344 or other types of patterned or structured light.

For illustrative purposes, the infrared projector 602 is depicted as a standalone device, although it is understood that the infrared projector 602 can be integrated into the light source 342 or embedded into the frame 404 of the first display interface 230. As depicted in FIG. 6, the infrared projector 602 can be positioned above the first display interface 230. In other examples not depicted in FIG. 6, the infrared projector 602 can be positioned at other portions of the frame 404 including a corner, a left side, a right side, or a combination thereof.

The infrared projector 602 can generate the infrared emission 604 away from the first display interface 230 toward a subject or scene. For example, the infrared projector 602 can be configured to direct the infrared emission 604 toward the first user 312.

The infrared projector 602 can direct the infrared emission 604 toward the first user 312 for augmenting or enhancing the amount of IR or NIR light surrounding the first user 312. In addition, the infrared projector 602 can direct the infrared emission 604 at the first user 312 for increasing the amount of the IR or NIR light reflected off of the first user 312. For example, the infrared projector 602 can direct the infrared emission 604 at the first user 312 for increasing the amount of the incident light ray 310 in the IR or NIR spectral range emanating from the first user 312.

As depicted in FIG. 6, the reflective film 302 of the first device 101 can include an infrared grating channel 606. The infrared grating channel 606 is a feature within the reflective film 302 for reflecting light in an infrared or near-infrared spectral range at an angle. For example, the angle can be between 45 degrees and 89 degrees. Also, for example, the infrared grating channel 606 can be an instance of the diffraction grating 304 of FIG. 3 with a higher grating frequency or a smaller grating distance than the diffraction grating 304 used to diffract wavelengths corresponding to or within the reflective grating spectra 306 of FIG. 3. Also for example, the infrared grating channel 606 can be an instance of the diffraction grating 304 including a thickness or a surface angle configured to reflect IR or NIR light.

For illustrative purposes, the infrared grating channel 606 is depicted as incorporated or integrated into the same instance of the reflective film 302 configured to reflect the reflective grating spectra 306. However, it is understood that the infrared grating channel 606 can be included in another instance of the reflective film 302 separate from the reflective film 302 configured to reflect the reflective grating spectra 306.

The reflective film 302 incorporating the infrared grating channel 606 can be used to reflect bandwidths of light in the IR or NIR spectral range corresponding to an infrared profile 608. The infrared profile 608 is an image or depiction of a subject or scene composed of IR or NIR light rays emanating from the subject or scene. The infrared profile 608 can be the image or depiction of the first user 312 composed of IR or NIR light rays emanating from the first user 312.

The reflective film 302, including the infrared grating channel 606, can reflect the infrared profile 608 at an instance of the reflection angle 308 of FIG. 3 different from the reflection angle 308 of the image 316. The infrared grating channel 606 of the reflective film 302 can reflect the infrared profile 608 at a higher instance of the reflection angle 308 than the reflection angle 308 of the image 316. For example, the reflection angle 308 of the image 316 can be 70 degrees and the reflection angle 308 of the infrared profile 608 can be 75 degrees.

The reflective film 302 can reflect the infrared profile 608 at an instance of the first image capture unit 231 configured to capture or perceive light rays in the IR or NIR spectral range. For illustrative purposes, the reflective film 302 is depicted as reflecting the infrared profile 608 at an instance of the first image capture unit 231 separate from the first image capture unit 231 configured to capture light rays corresponding to the image 316. However, it is understood that the reflective film 302 can reflect the infrared profile 608 and the image 316 at an instance of the first image capture unit 231 configured to capture or perceive both visible light and light rays in the IR or NIR spectral range.

The first control unit 212 can use the infrared profile 608 captured by the first image capture unit 231 to determine a depth or a position of a subject or scene, such as the first user 312 and the second user 322 of FIG. 3. In addition, the first control unit 212 can use the infrared profile 608 captured by the first image capture unit 231 to determine a three-dimensional (3D) topography of a subject or scene such as a facial or appendage feature of the first user 312.

In addition, the first control unit 212 can use the infrared profile 608 to determine a physical gesture made by an appendage or body part of the first user 312. Moreover, the first control unit 212 can also use the infrared profile 608 to determine a gaze direction of the first user 312 as represented by a head or body position of the first user 312.

Figure 7:
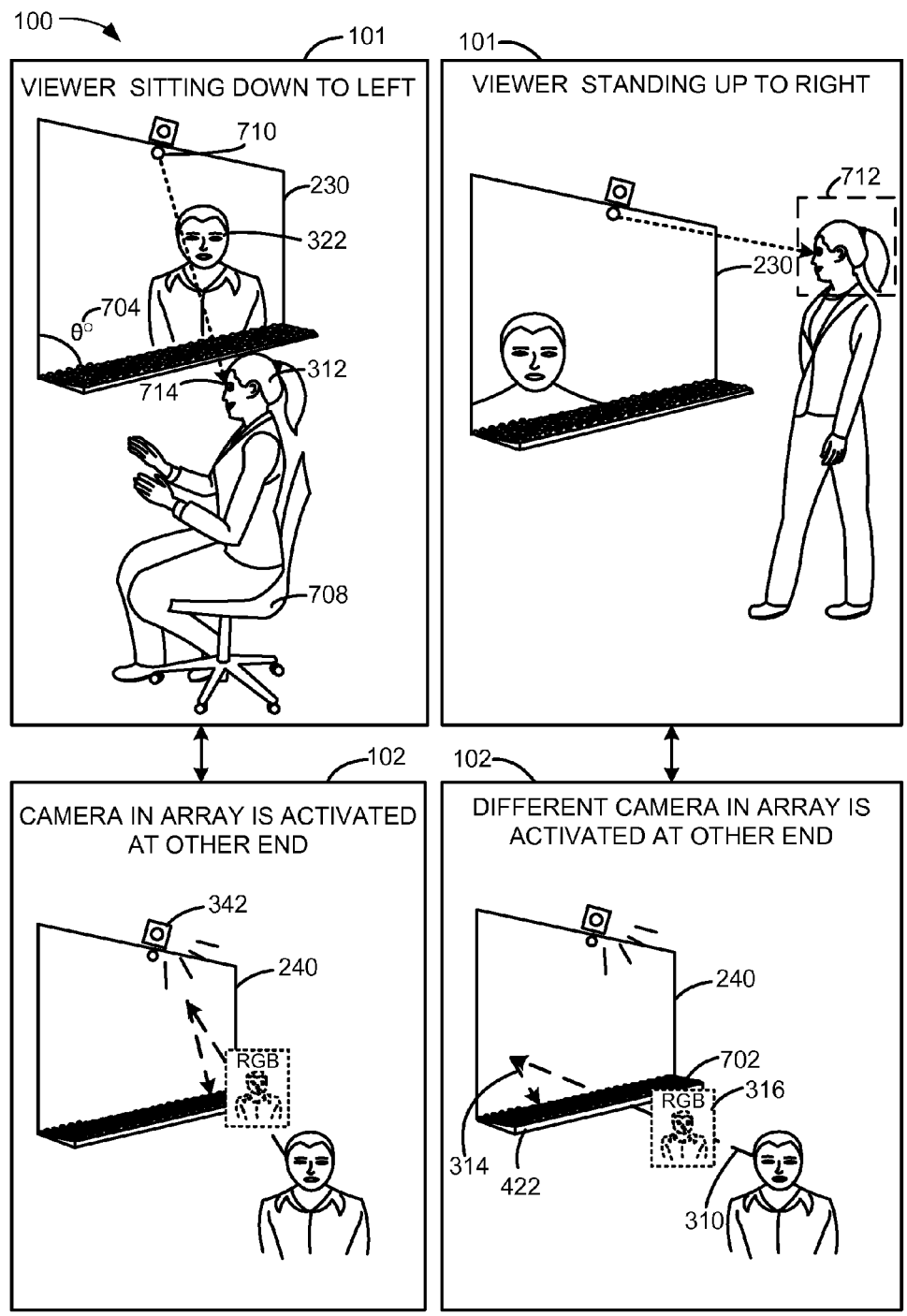
FIG. 7 is an example diagram of the electronic system in operation.

Referring now to FIG. 7, therein is shown an example diagram of the electronic system 100 in operation. The first device 101, the second device 102, or a combination thereof can include an image capture array 702 of multiple instances of the first image capture unit 231.

The image capture array 702 is a collection of cameras or sensors for capturing a light ray reflected from the reflective film 302. For example, the image capture array 702 can include multiple instances of the first image capture unit 231 of FIG. 2 arranged as a matrix, a grid, a patterned arrangement, or a combination thereof. In addition, one or more instances of the notch filter 332 of FIG. 3 can filter the cameras or sensors of the image capture array 702.

The image capture array 702 can be coupled to the support structure 402 of FIG. 4 of the first display interface 230, the second display interface 240, or a combination thereof. For example, the image capture array 702 can be coupled to the frame 404 of the first display interface 23, the second display interface 240, or a combination thereof including an upper bezel or a lower bezel. Also, for example, the image capture array 702 can be coupled to the base stand 406 of the first display interface 23, the second display interface 240, or a combination thereof.

The image capture array 702 can also be coupled to the tray component 422 of the first device 101, the second device 102, or a combination thereof. As depicted in FIG. 7, the image capture array 702 can cover a top surface of the tray component 422 or a portion therein. In this example, the tray component 422 can be coupled to a lower bezel of the first display interface 230 and the second display interface 240.

In an example embodiment not depicted in FIG. 7, the tray component 422 can be coupled to an upper bezel of the first display interface 230 or the second display interface 240 and the image capture array 702 can cover an underside of the tray component 422 or a portion therein. In this example embodiment, the first device 101, the second device 102, or a combination thereof can include the mirror 414 coupled to another instance of the tray component 422 coupled to a lower bezel of the first display 230 or the second display interface 240.

The image capture units of the image capture array 702 can be positioned at multiple array positions 704 to capture light rays reflected from the reflective film 302 or the mirror 414 at different angles or locations relative to the reflective film 302. The array positions 704 can be physical locations or orientation angles of the image capture units of the image capture array 702. For example, the array positions 704 can be physical locations on the tray component 422 used to support the image capture array 702.

The image capture unit at each of the array positions 704 can capture a different instance of the image 316 corresponding to a different portion of the scene or subject in front of the display interface including the first display interface 230, the second display interface 240, or a combination thereof. For example, the image capture units of the image capture array 702 can capture the incident light ray 310 emanating from the first user 312 at different instances of the array positions 704. As a more specific example, one of the image capture units at one edge of the image capture array 702 can capture a side profile of the first user 312 while another one of the image capture units at an opposite edge of the image capture array 702 can capture a side profile of the first user 312 from an opposite side.

The electronic system 100 can determine a viewer position 708 of a user, such as the first user 312, the second user 322 or a combination thereof viewing a display interface such as the first display interface 230 or the second display interface 240. The electronic system 100 can use a viewer tracking unit 710 to determine the viewer position 708.

The viewer position 708 is a location or direction of an appendage or a body part of a user viewing a display interface. The viewer position 708 can include a head position 712, an eye position 714, or a combination thereof.

The head position 712 is a location or direction of a head of a user. For example, the head position 712 can be the location of the head of the first user 312 relative to a reference point on the first display interface 230. The eye position 714 is a location or direction of an eye of a user, or a portion therein. For example, the eye position 714 can be the direction of an iris of the first user 312.

The viewer tracking unit 710 is a device for determining the viewer position 708. The viewer tracking unit 710 can be a device for determining the viewer position 708 of the first user 312 viewing the first display interface 230, the second user 322 viewing the second display interface 240, or a combination thereof. For example, the viewer tracking unit 710 can include a depth sensor, an IR sensor, a stereoscopic camera, or a combination thereof. Also, as another example, the first image capture unit 231, the second image capture unit 241, or a combination thereof can serve as the viewer tracking unit 710 for determining the viewer position 708.

The viewer tracking unit 710 can determine the viewer position 708 using a computer vision algorithm, a depth sensing algorithm, or a combination thereof. The viewer tracking unit 710 can determine the viewer position 708 relative to a reference point on a device of the electronic system 100 such as the first display interface 230, the second display interface 240, the first image capture unit 231 of FIG. 2, the second image capture unit 241 of FIG. 2, or the reflective film 302.

The viewer tracking unit 710 can determine the viewer position 708 at the first device 101. For example, the viewer tracking unit 710 can determine the viewer position 708 of the first user 312 viewing the first display interface 230. The viewer tracking unit 710 can communicate the viewer position 708 to the first control unit 212 of FIG. 2, the second control unit 234 of FIG. 2, the third control unit 260 of FIG. 2, or a combination thereof.

For example, the first control unit 212, the second control unit 234, the third control unit 260, or a combination thereof can identify or select one or more of the image capture units of the image capture array 702 at the second device 102 to capture the image 316 of a scene or subject at the second device 102 based on the viewer position 708 of the first user 312 at the first device 101. The first control unit 212, the second control unit 234, the third control unit 260, or a combination thereof can identify or select the image capture units of the image capture array 702 by associating a particular instance of the viewer position 708 at the first device 101 with one of the array positions 704 of the image capture array 702 at the second device 102.

As a more specific example, the electronic system 100 can associate the viewer position 708 relative to a center point of the first display interface 230 with the image capture unit at one of the array positions 704 relative to a center point of the image capture array 702 at the second device 102. In this example, the electronic system 100 can associate the viewer position 708 to the left side of the center point (as viewed from the perspective of a viewer) of the first display interface 230 with the image capture unit at one of the array positions 704 to the right side of the center point of the image capture array 702.

As another example, the electronic system 100 can associate the viewer position 708 to the right of the center point of the first display interface 230 with the image capture unit at one of the array positions 704 to the left side of the center point of the image capture array 702. As yet another example, the electronic system 100 can associate the viewer position 708 below the center point of the first display interface 230 with the image capture unit at one of the array positions 704 closer to the reflective film 302 of the second device 102. Moreover, the electronic system 100 can associate the viewer position 708 above the center point of the first display interface 230 with the image capture unit at one of the array positions 704 further away from the reflective film 302 of the second device 102.

The image capture units of the image capture array 702 at the second device 102 can then capture an instance of the image 316 from the array positions 704 identified or selected by the first control unit 212, the second control unit 234, the third control unit 260, or a combination thereof. The one or more image capture units identified or selected at the array positions 704 can capture an instance of the image 316 reflected from the reflective film 302 attached to the second display interface 240. Each instance of the image 316 captured by the image capture unit at each of the array positions 704 can be different based on the physical distance or angular orientation of the image capture unit relative to the reflective film 302.

For example, the first user 312 can initially be sitting down in a chair when viewing the first display interface 230. In addition, the first user 312 can be sitting down in a chair toward a left side bezel of the first display interface 230. The viewer tracking unit 710 can determine the viewer position 708, including the head position 712, as below and to the left of the center point of the first display interface 230. Based on this example, the first control unit 212, the second control unit 234, the third control unit 260, or a combination thereof can identify or select the image capture unit to the right of the center point of the image capture array 702 to capture the image 316 of the second user 322 reflected from the reflective film 302 covering the second display interface 240.

Continuing with this example, the first user 312 can transition to standing up and walking to the right side bezel of the first display interface 230. In addition, the first user 312 can stand closer to the first display interface 230 than in the sitting position previously discussed above. The viewer tracking unit 710 can determine the viewer position 708, including the head position 712, as above and to the right of the center point of the first display interface 230.

In addition, the viewer tracking unit 710 can determine the viewer position 708 as closer to the first display interface 230. Based on this example, the first control unit 212, the second control unit 234, the third control unit 260, or a combination thereof can identify or select the image capture unit to the left of the center point of the image capture array 702 to capture the image 316 of the second user 322 reflected from the reflective film 302 covering the second display interface 240.

For illustrative purposes, the electronic system 100 is depicted as identifying or selecting one camera from the image capture array 702. However, it should be understood that two or more cameras from the image capture array 702 can be identified or selected to capture the image 316 from multiple instances of the array positions 704.

It has been discovered that determining the viewer position 708 of the first user 312 at the first device 101 and changing the image 316 of the second user 322 displayed on the first display interface 230 based on the viewer position 708 of the first user 312 improves the user experience of the electronic system 100 by allowing the first user 312 to experience parallax based on the position of the first user 312. For example, as the viewer position 708 of the first user 312 changes, the image 316 of the second user 322 displayed on the first display interface 230 also changes as different image capture units at different instances of the array positions 704 are identified or selected to capture the subject or scene. By providing the first user 312, the second user 322, or a combination thereof with this parallax experience, the electronic system 100 provides a user experience more closely resembling in-person communication in the real world.

Figure 8:
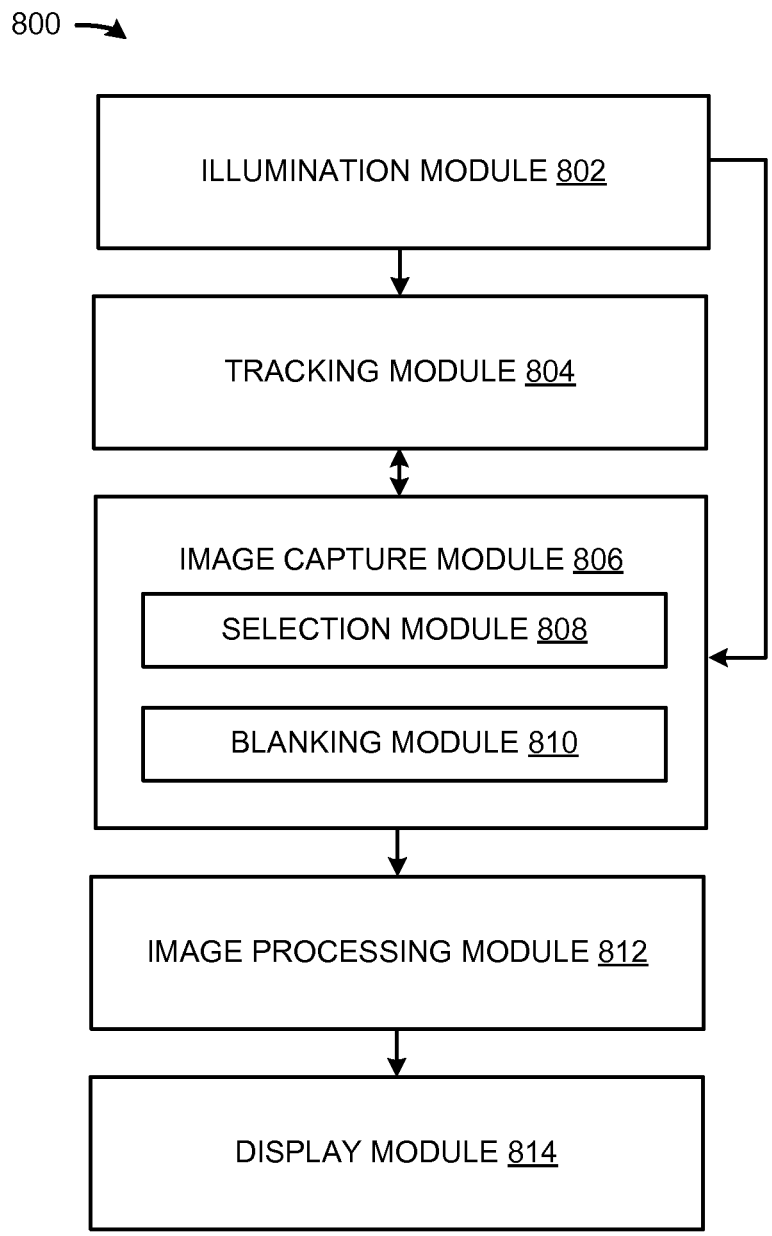
FIG. 8 is a control flow of an embodiment of the electronic system.

Referring now to FIG. 8, therein is shown a control flow 800 of the electronic system 100 of FIG. 1. The electronic system 100 can include an illumination module 802, a tracking module 804, an image capture module 806, an image processing module 812, a display module 814, or a combination thereof.

The illumination module 802 is configured to illuminate a scene or subject, such as the first user 312 of FIG. 2, the second user 322 of FIG. 2, or a combination thereof at the first device 101 of FIG. 1, the second device 102 of FIG. 1, or a combination thereof. For illustrative purposes, the illumination module 802 is shown as part of the control flow 800, although it is understood that the electronic system 100 can function without the illumination module 802, the light source 342 of FIG. 3, or a combination thereof.

As an example, the illumination module 802 can determine if the light source 342 is included in the electronic system 100. The illumination module 802 can pass the control flow 800 directly to the tracking module 804 or the image capture module 806 when the light source 342 is not included in the electronic system 100.

The illumination module 802 can use the light source 342 of FIG. 3 to illuminate the scene or subject at the first device 101, the second device 102, or a combination thereof. For example, the illumination module 802 can control the light source 342 to illuminate the first user 312 while the first user 312 is viewing the first display interface 230 of FIG. 2. As another example, the illumination module 802 can detect status, orientation, setting, or a combination thereof for the light source 342 illuminating the second user 322 while the second user 322 is viewing the second display interface 240 of FIG. 2.

The illumination module 802 can illuminate the scene or subject for increasing the amount of the incident light ray 310 of FIG. 3 emanating from the scene or subject. The illumination module 802 can use the light source 342 to generate the illumination light 343 corresponding to or within the illumination spectra 344 of FIG. 3. As previously discussed, the illumination spectra 344 can align with the reflective grating spectra 306 of FIG. 3 of the reflective film 302 of FIG. 3.

The illumination module 802 can be part of the first software 226 of FIG. 2, the second software 242 of FIG. 2, the third software 268 of FIG. 2, or a combination thereof. The first control unit 212 of FIG. 2 can execute the first software 226, the second control unit 234 of FIG. 2 can execute the second software 242, the third control unit 260 of FIG. 2 can execute the third software 268, or a combination thereof to illuminate the scene or subject including the first user 312, the second user 322, or a combination thereof.

The illumination module 802 can also be implemented as hardware circuitry or hardware accelerators in the first control unit 212, the second control unit 234, the third control unit 260, or a combination thereof. In addition, the illumination module 802 can also be implemented as hardware circuitry or hardware accelerators in the first device 101, the second device 102, the third device 103, or a combination thereof but outside of the first control unit 212, the second control unit 234, the third control unit 260, or a combination thereof. After illuminating a subject or scene at the first device 101, the second device 102, or a combination thereof, the control flow 800 can pass from the illumination module 802 to the tracking module 804.

The tracking module 804 is configured to determine the viewer position 708 of FIG. 7 of a user such as the first user 312, the second user 322, or a combination thereof. For illustrative purposes, the tracking module 804 is shown as part of the control flow 800, although it is understood that the tracking module 804 can be optional for other embodiments of the present invention.

As an example, the tracking module 804 can pass the control flow 800 directly to the image capture module 806 when the viewer position 708 is not a required input of the electronic system 100. In this example, the image capture module 806 can capture the image 316 of FIG. 3 of the first user 312 or the second user 322 using one or more image capture units, such as the first image capture unit 231, the second image capture unit 241, or a combination thereof, regardless of the viewer position 708.

As another example, the tracking module 804 can pass the control flow 800 directly to the image capture module 806 when the viewer tracking unit 710 of FIG. 7 is not included in the electronic system 100. In this example, the image capture module 806 can use the first image capture unit 231, the second image capture unit 241, or a combination thereof to capture the image 316 of FIG. 3 reflected from the reflective film 302 of FIG. 3. Continuing with this example, the image capture module 806 can then pass the control flow 800 back to the tracking module 804 after capturing the image 316. The tracking module 804 can analyze the image 316 to determine the viewer position 708. The tracking module 804 can use a computer vision algorithm to determine the viewer position 708 from the image 316 captured by the first image capture unit 231, the second image capture unit 241, or a combination thereof.

When the tracking module 804 detects the viewer tracking unit 710 is included in the electronic system 100, the tracking module 804 can use the viewer tracking unit 710 to determine the viewer position 708 including the head position 712 of FIG. 7, the eye position 714 of FIG. 7, or a combination thereof. For example, the tracking module 804 can track the eye position 714 of the first user 312 viewing the first display interface 230.

The tracking module 804 can determine the viewer position 708 using a computer vision algorithm, a depth sensing algorithm, or a combination thereof. The tracking module 804 can also determine the viewer position 708 relative to a reference point on a device of the electronic system 100 such as the first display interface 230, the second display interface 240, the first image capture unit 231 of FIG. 2, the second image capture unit 241 of FIG. 2, or the reflective film 302.

For example, the tracking module 804 can determine the viewer position 708 relative to a center point on the first display interface 230. As a more specific example, the tracking module 804 can determine the viewer position 708 as 2 meters to the left of the center point of the first display interface 230 and 1 meter in front of the reflective film 302.

The tracking module 804 can be part of the first software 226, the second software 242, the third software 268, or a combination thereof. The first control unit 212 can execute the first software 226, the second control unit 234 can execute the second software 242, the third control unit 260 can execute the third software 268, or a combination thereof to determine the viewer position 708.

The tracking module 804 can also be implemented as hardware circuitry or hardware accelerators in the first control unit 212, the second control unit 234, the third control unit 260, or a combination thereof. In addition, the tracking module 804 can also be implemented as hardware circuitry or hardware accelerators in the first device 101, the second device 102, the third device 103, or a combination thereof but outside of the first control unit 212, the second control unit 234, the third control unit 260, or a combination thereof.

Moreover, the tracking module 804 can also communicate the viewer position 708 to other modules in the control flow 800 or other devices of the electronic system 100 through the first communication unit 216 of FIG. 2, the second communication unit 236 of FIG. 2, the third communication unit 252 of FIG. 2 or a combination thereof. After determining the viewer position 708, the control flow 800 can pass from the tracking module 804 to the image capture module 806.

The image capture module 806 is configured to capture the image 316 reflected from the reflective film 302. The image capture module 806 can use the first image capture unit 231, the second image capture unit 241, or a combination thereof to capture the image 316 reflected from the reflective film 302.

The image capture module 806 can capture the image 316 based on the reflection angle 308 of FIG. 3, the reflective film 302, the diffraction grating 304, or a combination thereof. For example, the electronic system 100 can include mounts or predetermined configurations for locating the reflective film 302, the first image capture unit 231, the second image capture unit 241, the light source 342, the mirror 414, the image capture array 702, or a combination thereof. The image capture module 806 can use the reflection angle 308 predetermined by the electronic system 100 according to the mounts or the predetermined configurations.

Also for example, the electronic system 100 can determine the reflection angle 308. The electronic system 100 can determine the reflection angle 308 based on identifying the reflective film 302, the first image capture unit 231, the second image capture unit 241, the light source 342, the mirror 414, the image capture array 702, arrangements thereof, or a combination thereof.

As a more specific example, the image capture module 806 can communicate, such as by prompting or receiving, identification information for the reflective film 302, the first image capture unit 231, the second image capture unit 241, the light source 342, the mirror 414, the image capture array 702, or a combination thereof. Also as a more specific example, the image capture module 806 can communicate or interact with the first user 312 or the second user 322 to identify the reflective film 302, the first image capture unit 231, the second image capture unit 241, the light source 342, the mirror 414, the image capture array 702, mounts or configurations thereof, or a combination thereof.

Also as a more specific example, the image capture module 806 can include a self-configuration routine or mechanism for determining the reflection angle 308. The first user 312 or the second user 322 can input or hold up a known picture facing the reflective film 302, the first user 312 or the second user 322 can be at a known location before the reflective film 302, the first user 312 or the second user 322 can interact with the image capture module 806, or a combination thereof. The image capture module 806 can use the known inputs and the resulting instance of the image 316 captured through the first image capture unit 231, the second image capture unit 241, or a combination thereof to calculate the reflection angle 308.

The image capture module 806 can also include a selection module 808, a blanking module 810, or a combination thereof. The selection module 808 is configured to identify or select one or more image capture units from the image capture array 702 of FIG. 7 for capturing one or more instances of the image 316 from one or more of the array positions 704 of FIG. 7. For illustrative purposes, the selection module 808 is shown as part of the control flow 800, although it is understood that the selection module 808 can be option for other embodiments of the present invention including when the electronic system 100 does not include the image capture array 702 or when the electronic system 100 includes only one instance of the image capture unit.

The selection module 808 can identify or select one or more cameras or sensors at the first device 101 based on the viewer position 708 at the second device 102, and vice versa. For example, the selection module 808 can identify or select one or more instances of the first image capture unit 231 at the first device 101 based on the viewer position 708 of the second user 322 at the second device 102. Also, for example, the selection module 808 can identify or select one or more instances of the second image capture unit 241 at the second device 102 based on the viewer position 708 of the first user 312 at the first device 101.

As a more specific example, the selection module 808 can identify or select one or more cameras of the image capture array 702 coupled to the first display interface 230 based on the viewer position 708 of the second user 322 at the second device 102. As another example, the selection module 808 can identify or select one or more cameras of the image capture array 702 coupled to the second display interface 240 based on the viewer position 708 of the first user 312 at the first device 101.

The selection module 808 can associate one or more instances of the first image capture unit 231 or the second image capture unit 241 of the image capture array 702 with the viewer position 708. For example, the selection module 808 can associate one instance of the first image capture unit 231 of the image capture array 702 with one instance of the viewer position 708. In another example, the selection module 808 can associate one instance of the first image capture unit 231 of the image capture array 702 with multiple instances of the viewer position 708.

As a more specific example, the selection module 808 can associate the viewer position 708 to the left side of a center point, as viewed from the perspective of the first user 312, of the first display interface 230 with an image capture unit in the image capture array 702 to the right side of the center point of the second display interface 240, as viewed from the perspective of the second user 322. As another example, the selection module 808 can associate the viewer position 708 below the center point of the first display interface 230 with an image capture unit in the image capture array 702 closer to the reflective film 302 attached to the second display interface 240.

The selection module 808 can identify or select the image capture unit at one of the array positions 704 of FIG. 7 of the image capture array 702 at the second device 102 based on the viewer position 708 relative to the first display interface 230 at the first device 101. Once the tracking module 804 has determined the viewer position 708 at the first device 101, the selection module 808 can identify or select the corresponding image capture unit at one of the array positions 704 of the image capture array 702 at the second device 102 to capture the image 316 of a subject or scene at the second device 102.

The selection module 808 can further analyze the individual instance of the image 316 resulting from each of the cameras in the image capture array 702. The selection module 808 can identify or select the instance of the image 316 having the first user 312 or the second user 322 in a center portion of the image 316, the image 316 with the largest or most complete depiction of the first user 312 or the second user 322 according to images of body parts predetermined by the electronic system 100, or a combination thereof.

The image capture module 806 can also include the blanking module 810. The blanking module 810 is configured to synchronize the blanking interval 328 and the frame capture interval 330 for reducing an interference caused by the display light 320 of FIG. 3 with the image 316 captured by the image capture unit. For illustrative purposes, the blanking module 810 is shown as part of the control flow 800, although it is understood that the blanking module 810 can be optional for other embodiments of the present invention including when the display light 320 is filtered from the image 316 using image filtering algorithms such as a notch filtering algorithm.

The blanking module 810 can synchronize the blanking interval 328 with the frame capture interval 330 for reducing the interference caused by the display light 320 of FIG. 3 with the image 316 captured by the first image capture unit 231, the second image capture unit 241, or a combination thereof. The blanking module 810 can adjust the blanking interval 328 or timing of the first display interface 230, the second display interface 240, or a combination thereof to match or align with the frame capture interval 330 of the first image capture unit 231, the second image capture unit 241, or a combination thereof. The blanking module 810 can also adjust the frame capture interval 330 or the timing of the first image capture unit 231, the second image capture unit 241, or a combination thereof to match or align with the blanking interval 328 of the first display interface 230, the second display interface 240, or a combination thereof. As previously discussed, the blanking interval 328 and the frame capture interval 330 can be 30 Hz or above.

The blanking module 810 can generate an opaque or monochromatic graphic at the blanking interval 328. As a more specific example, the blanking module 810 can use the first display interface 230, the second display interface 240, or a combination thereof to generate a black-colored graphic at the blanking interval 328.

The blanking module 810 can use the first image capture unit 231, the second image capture unit 241, or a combination thereof to generate the frame capture interval 330. The frame capture interval 330 can include a shutter speed, an exposure time, a capture rate, or a combination thereof of a camera or sensor. The blanking module 810 can synchronize the blanking interval 328 with the frame capture interval 330 by equating a frequency of the blanking interval 328 with the frequency of the frame capture interval 330.

The blanking module 810 can synchronize the blanking interval 328 with the frame capture interval 330 for ensuring the first image capture unit 231, the second image capture unit 241, or a combination thereof capture the image 316 reflected from the reflective film 302 when the display light 320 is minimized or extinguished. In addition, the blanking module 810 can synchronize the blanking interval 328 with the frame capture interval 330 for preventing the first image capture unit 231 or the second image capture unit 241 from capturing the display spectra 324 of FIG. 3 along with the reflective grating spectra 306.

The image capture module 806 can be part of the first software 226, the second software 242, the third software 268, or a combination thereof. The first control unit 212 can execute the first software 226, the second control unit 234 can execute the second software 242, the third control unit 260 can execute the third software 268, or a combination thereof to capture the image 316.

The image capture module 806 can also be implemented as hardware circuitry or hardware accelerators in the first control unit 212, the second control unit 234, the third control unit 260, or a combination thereof. In addition, the image capture module 806 can also be implemented as hardware circuitry or hardware accelerators in the first device 101, the second device 102, the third device 103, or a combination thereof but outside of the first control unit 212, the second control unit 234, the third control unit 260, or a combination thereof.

Moreover, the image capture module 806 can also communicate the image 316 to other modules in the control flow 800 or other devices of the electronic system 100 through the first communication unit 216, the second communication unit 236, the third communication unit 252 or a combination thereof. After capturing the image 316, the control flow 800 can pass from the image capture module 806 to the image processing module 812.

The image processing module 812 is configured to apply the image processing mechanism 348 of FIG. 3 to the image 316 reflected from the reflective film 302 and captured by the first image capture unit 231 or the second image capture unit 241. The image processing module 812 can use the first control unit 212, the second control unit 234, the third control unit 260, or a combination thereof to apply the image processing mechanism 348 to the image 316 captured by the first image capture unit 231, the second image capture unit 241, or a combination thereof.

For example, the image processing mechanism 348 can be a digital signal processing technique such as a pixel-based processing algorithm, gradient domain image processing algorithm, or a combination thereof. As a more specific example, the image processing mechanism 348 can include an image resizing technique, an image sharpening algorithm, a perspective distortion correction technique such as a vertical or horizontal correction technique, a raster-based interpolation technique, or a combination thereof. As another example, the image processing mechanism 348 can include a frequency filtering algorithm including a notch filtering algorithm to filter out the display light 320 of the first display interface 230 from the image 316 based on frequencies corresponding to the notch filter spectra 334 of FIG. 3.

The image processing module 812 can apply the image processing mechanism 348 to the image 316 reflected by the reflective film 302 and captured by the first image capture unit 231, the second image capture unit 241, or a combination thereof. In addition, the image processing module 812 can apply the image processing mechanism 348 to the image 316 reflected by the mirror 414 of FIG. 4 and captured by the first image capture unit 231, the second image capture unit 241, or a combination thereof.

The image processing module 812 can apply the image processing mechanism 348 to the image 316 reflected from the reflective film 302 to remove a distortion caused by a height of the reflection angle 308 of FIG. 3 or the mirroring angle 420 of FIG. 4. In addition, the image processing module 812 can apply the image processing mechanism 348 by applying a raster-based technique to the image 316 by inversely mapping the image 316 onto a three-dimensional computer graphic geometry. Moreover, the image processing module 812 can apply the image processing mechanism 348 by applying a vertical re-sizing algorithm to the image 316 to correct a vertical compression of the image 316.

For example, the image processing module 812 can rearrange columns or rows of pixels according to the various angles and configurations between the devices. As a more specific example, the image processing module 812 can horizontally or vertically stretch the image 316 captured by the first image capture unit 231, the second image capture unit 241, or a combination thereof, change aspect ratios, tilt or rotate the image 316, correct skews in the image 316, or a combination thereof based on the various angles or configurations, such as the mirroring angle 420, the reflection angle 308, or a combination thereof.

Also for example, the image processing module 812 can interpolate points or lines according to the various angles or configurations. Also for example, the image processing module 812 can use predetermined mechanisms or methods to extrapolate or interpolate the wavelengths or colors based on the various angles or configurations.

The image processing module 812 can be part of the first software 226, the second software 242, the third software 268, or a combination thereof. The first control unit 212 can execute the first software 226, the second control unit 234 can execute the second software 242, the third control unit 260 can execute the third software 268, or a combination thereof to apply the image processing mechanism 348 to the image 316.

The image processing module 812 can also be implemented as hardware circuitry or hardware accelerators in the first control unit 212, the second control unit 234, the third control unit 260, or a combination thereof. In addition, the image capture module 806 can also be implemented as hardware circuitry or hardware accelerators in the first device 101, the second device 102, the third device 103, or a combination thereof but outside of the first control unit 212, the second control unit 234, the third control unit 260, or a combination thereof.

Moreover, the image processing module 812 can also communicate the processed instance of the image 316 to other modules in the control flow 800 or other devices of the electronic system 100 through the first communication unit 216, the second communication unit 236, the third communication unit 252 or a combination thereof. After applying the image processing mechanism 348 to the image 316, the control flow 800 can pass from the image processing module 812 to the image display module 814.

The display module 814 is configured to display the image 316 captured by the first device 101 at the second device 102, and vice versa. The display module 814 can display the image 316 processed by the image processing module 812 using the image processing mechanism 348. The display module 814 can display the image 316 using the first display interface 230, the second display interface 240, or a combination thereof.

The display module 814 can retrieve the image 316 from the first storage unit 214 of FIG. 2, the second storage unit 246 of FIG. 2, the third storage unit 264 of FIG. 2, or a combination thereof. The display module 814 can then use the first communication unit 216, the second communication unit 236, the third communication unit 252 of FIG. 2, or a combination thereof to communicate the image 316 over the communication path 104.

The display module 814 can display the image 316 at a device different from the device used to capture the image 316. For example, the display module 814 can display the image 316 captured by the first device 101 at the second device 102. As a more specific example, the display module 814 can display the image 316 captured by the first image capture unit 231 of the first device 101 at the second display interface 240 of the second device 102.

The display module 814 can also display the image 316 at the same device used to capture the image 316. For example, the display module 814 can display the image 316 as a picture-in-picture screen on the same device used to capture the image 316. As a more specific example, the display module 814 can display the image 316 captured by the first image capture unit 231 of the first device 101 at the first display interface 230 through a picture-in-picture screen or graphic.

The display module 814 can be part of the first software 226, the second software 242, the third software 268, or a combination thereof. The first control unit 212 can execute the first software 226, the second control unit 234 can execute the second software 242, the third control unit 260 can execute the third software 268, or a combination thereof to display the image 316.

The display module 814 can also be implemented as hardware circuitry or hardware accelerators in the first control unit 212, the second control unit 234, the third control unit 260, or a combination thereof. In addition, the display module 814 can also be implemented as hardware circuitry or hardware accelerators in the first device 101, the second device 102, the third device 103, or a combination thereof but outside of the first control unit 212, the second control unit 234, the third control unit 260, or a combination thereof.

The physical transformation of the image 316 captured by the first image capture unit 231, the second image capture unit 241, or a combination thereof and displayed on the first display interface 230, the second display interface 240, or a combination thereof results in movement in the physical world, such as people using the first device 101, the second device 102, the third device 103, or a combination thereof to communicate with one another. As the movement in the physical world occurs, the movement itself creates additional instances of the image 316 that is displayable on the first display interface 230, the second display interface 240, or a combination thereof for the continued operation of the electronic system 100 and to continue movement in the physical world.

The modules described herein can be hardware implementation or hardware accelerators, including passive circuitry, active circuitry, or both, in the first control unit 212, the second control unit 234, the third control unit 260, or a combination thereof. The modules can also be hardware implementation or hardware accelerators, including passive circuitry, active circuitry, or both, within the first device 101, the second device 102, the third device 103, or a combination thereof but outside of the first control unit 212, the second control unit 234, the third control unit 260, or a combination thereof.

For illustrative purposes, the various modules have been described as being specific to the first device 101, the second device 102, the third device 103, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 214, the second storage unit 246, the third storage unit 264 or a combination thereof can represent the non-transitory computer readable medium. The first storage unit 214, the second storage unit 246, the third storage unit 264, or a combination thereof, or a portion therein can be removable from the first device 101, the second device 102, the third device 103, or a combination thereof. Examples of the non-transitory computer readable medium can be a non-volatile memory card or stick, an external hard disk drive, a tape cassette, or an optical disk.

Figure 9:
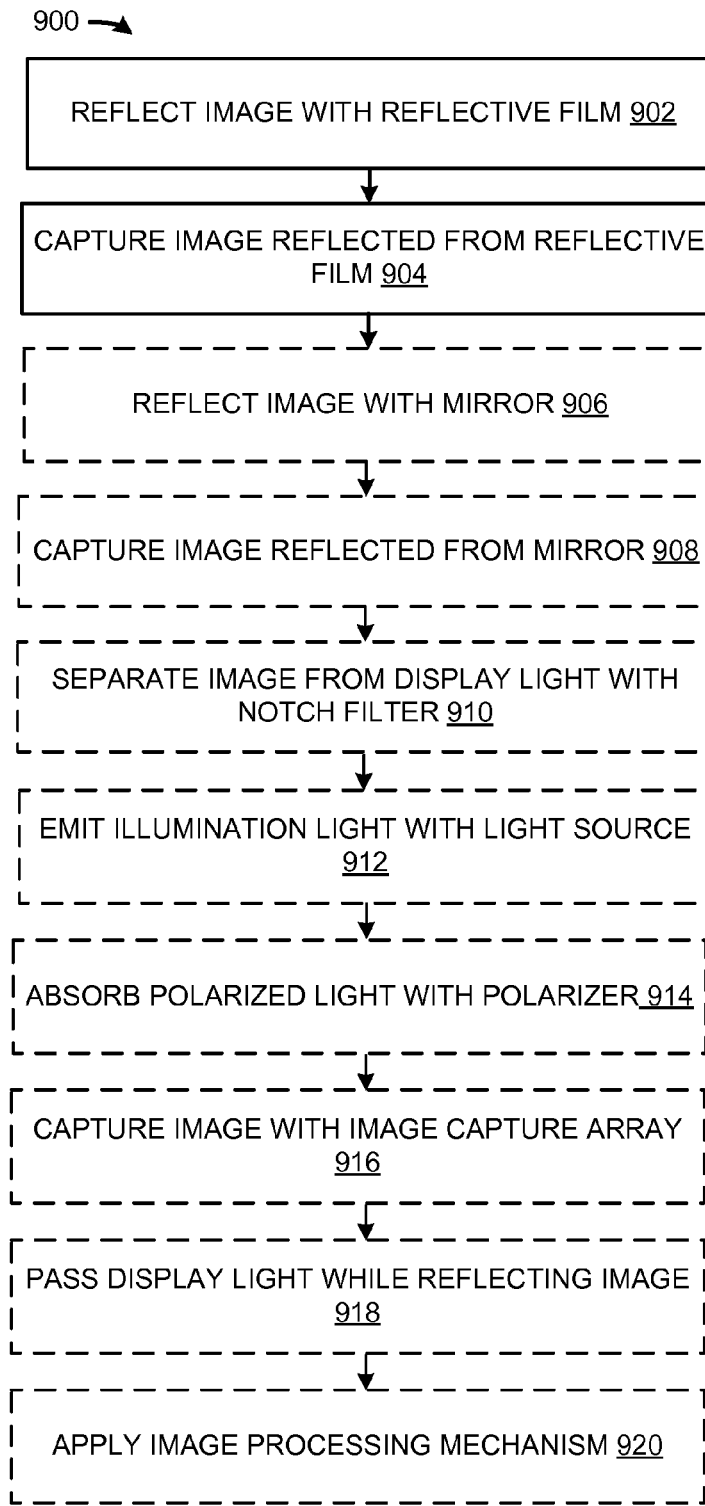
FIG. 9 is a flow chart of a method of operation of the electronic system in a further embodiment of the present invention.

Referring now to FIG. 9, therein is shown an exemplary flow chart of a method 900 of operation of the electronic system 100 of FIG. 1 in a further embodiment. In one example embodiment, the electronic system 100 can implement the control flow 800 of FIG. 8.

The method 900 can include reflecting, with the reflective film 302 of FIG. 3 including the diffraction grating 304 of FIG. 3, the image 316 of FIG. 3 within the reflective grating spectra 306 at the reflection angle 308 in a block 902. The method 900 can further include capturing, with the first image capture unit 231 positioned at the device orientation 318 of FIG. 3, the image 316 reflected from the reflective film 302 in a block 904.

The method 900 can also include reflecting, with the mirror 414 of FIG. 4 positioned at the first edge 416 of FIG. 4 of the reflective film 302, the image 316 reflected from the reflective film 302, wherein the mirror 414 forms the mirroring angle 420 of FIG. 4 with the reflective film 302 in a block 906. The method 900 can further include capturing, with the first image capture unit 231 positioned the second edge 418 of FIG. 4 of the reflective film 302 opposite or adjacent to the first edge 416, the image 316 reflected from the mirror 414 at another instance of the device orientation 318 aligned with the mirroring angle 420 in a block 908.

The method 900 can also include separating, with the notch filter 332 of FIG. 3 the image 316 from the display light 320 of FIG. 3 of the first display interface 240 coupled to the reflective film 302 based on the notch filter spectra 334 of FIG. 3 corresponding to the reflective grating spectra 306, wherein the notch filter 332 is configured to attach to the lens 326 of FIG. 3 of the first image capture unit 231 in a block 910. The method 900 can further include emitting, with the light source 342 of FIG. 3, the illumination light 343 directed away from the reflective film, the illumination light within the illumination spectra 344 of FIG. 3 corresponding to the reflective grating spectra 306 in a block 912.

The method 900 can also include absorbing, with the polarizer 338 of FIG. 3 coupled to the lens 326 of the first image capture unit 231, the polarized light 340 of FIG. 3 generated by the first display interface 230 coupled to the reflective film 302, wherein the polarizer 338 is configured to attach to the lens 326 of the first image capture unit 231 in a block 914. The method 900 can further include capturing, with the first image capture unit 231 positioned at one of the array positions 704 of FIG. 7 within the image capture array 702 of FIG. 7 including other instances of the first image capture unit 231, the image 316 reflected from the reflective film 302 in a block 916. The method 900 can further include reflecting, with the reflective film 302, the image 316 while passing the display light 320 of FIG. 3 from the first display interface 230 coupled to the reflective film 302 in a block 918. The method 900 can also include applying, with the first control unit 212, coupled to the first image capture unit 231, the image processing mechanism 348 of FIG. 3 to the image 316 captured by the first image capture unit 231 in a block 920.

Figure 10:
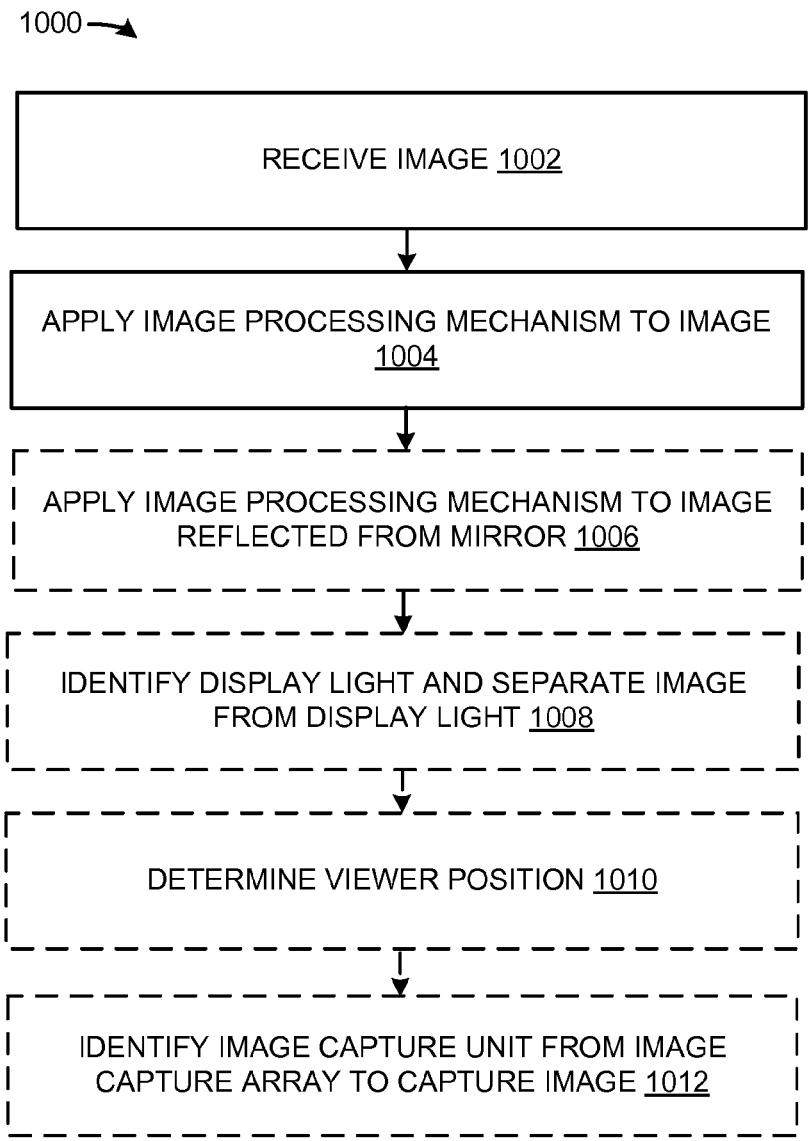
FIG. 10 is a flow chart of another method of operation of the electronic system in a further embodiment of the present invention.

Referring now to FIG. 10, therein is shown another exemplary flow chart of a method 1000 of operation of the electronic system 100 of FIG. 1 in a further embodiment. In one example embodiment, the electronic system 100 can implement the control flow 800 of FIG. 8.

The method 1000 can include receiving the image 316 of FIG. 3 within the reflective grating spectra 306 of FIG. 3 in a block 1002. The method 1000 can also include applying, with the first control unit 212, the image processing mechanism 348 of FIG. 3 to the image 316 for processing the image 316 reflected from the reflective film 302 of FIG. 3 at the reflection angle 308 of FIG. 3 and captured by the first image capture unit 231 at the device orientation 318 of FIG. 3 aligned with the reflection angle 308 in a block 1004.

The method 1000 can also include applying the image processing mechanism 348 to the image 316 reflected from the mirror 414 of FIG. 4 for reflecting the image 316 at the mirroring angle 420 of FIG. 4 toward the first image capture unit 231 in a block 1006. The method 1000 can further include identifying the display light 320 of FIG. 3 within the display spectra 324 of FIG. 3 being displayed on the first display interface 230 coupled to the reflective film 302, wherein applying the image processing mechanism 348 includes separating the image 316 from the display light 320 based on the display spectra 324, the reflective grating spectra 306, or a combination thereof in a block 1008.

The method 1000 can also include determining the viewer position 708 of FIG. 7 in a block 1010. The method 1000 can further include identifying the first image capture unit 231 at one of the array positions 704 of FIG. 7 of the image capture array 702 of FIG. 7 based on the array position 704 corresponding to the viewer position 708 for capturing the image 316 reflected by the reflective film 302 in a block 1012.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
   a reflective film including a diffraction grating configured to reflect an incident light traveling toward a first display and comprising an image of a first user for directing a reflected light within a reflective grating spectra at a reflection angle formed between the first display and the reflected light in reflecting the image using the reflective film located between a first display and the first user, wherein the reflection angle is less than 90 degrees;
   an image capture unit coupled to the reflective film and positioned at a device orientation to capture the image reflected from the reflective film; and
   a communication unit, coupled to the image capture unit, configured to communicate the image reflected at the reflection angle from the first display for displaying the image of the first user on a second display in providing gaze alignment between the first user and a second user through the first display and the second display.

2. The system as claimed in claim 1 further comprising:
   a mirror positioned at a first edge of the reflective film and forming a mirroring angle with the reflective film;
   wherein:
   the reflective film is configured to reflect the image to the mirror; and
   the image capture unit is positioned at a second edge opposite the first edge and configured to capture the image reflected from the mirror at another instance of the device orientation aligned with the mirroring angle.

3. The system as claimed in claim 1 further comprising a notch filter configured to separate the image from a display light of the first display coupled to the reflective film based on a notch filter spectra corresponding to the reflective grating spectra, wherein the notch filter is configured to attach to a lens of the image capture unit.

4. The system as claimed in claim 1 further comprising a light source configured to emit an illumination light directed away from the reflective film, the illumination light within an illumination spectra corresponding to the reflective grating spectra.

5. The system as claimed in claim 1 further comprising a polarizer, coupled to a lens of the image capture unit, configured to absorb polarized light generated by the first display coupled to the reflective film.

6. The system as claimed in claim 1 wherein the image capture unit is within an image capture array including other instances of the image capture unit positioned at an array position to capture the image reflected from the reflective film.

7. The system as claimed in claim 1 wherein the reflective film is configured to reflect the image while passing a display light from the first display coupled to the reflective film.

8. The system as claimed in claim 1 further comprising a control unit, coupled to the image capture unit, configured to apply an image processing mechanism to the image captured by the image capture unit.

9. A method of operation of an electronic system comprising:
- reflecting, with a reflective film including a diffraction grating, an incident light traveling toward a first display and comprising an image of a first user for directing a reflected light within a reflective grating spectra at a reflection angle formed between the first display and the reflected light in reflecting the image using the reflective film located between a first display and the first user, wherein the reflection angle is less than 90 degrees;
- capturing, with an image capture unit positioned at a device orientation, the image reflected from the reflective film; and
- communicating the image reflected at the reflection angle from the first display for displaying the image of the first user on a second display in providing gaze alignment between the first user and a second user through the first display and the second display.

10. The method as claimed in claim 9 further comprising:
- reflecting, with a mirror positioned at a first edge of the reflective film, the image reflected from the reflective film, wherein the mirror forms a mirroring angle with the reflective film; and
- capturing, with the image capture unit positioned at a second edge of the reflective film opposite or adjacent to the first edge, the image reflected from the mirror at another instance of the device orientation aligned with the mirroring angle.

11. The method as claimed in claim 9 further comprising separating, with a notch filter, the image from a display light of the first display coupled to the reflective film based on a notch filter spectra corresponding to the reflective grating spectra, wherein the notch filter is configured to attach to a lens of the image capture unit.

12. The method as claimed in claim 9 further comprising emitting, with a light source, an illumination light directed away from the reflective film, the illumination light within an illumination spectra corresponding to the reflective grating spectra.

13. The method as claimed in claim 9 further comprising absorbing, with a polarizer coupled to a lens of the image capture unit, polarized light generated by the first display coupled to the reflective film.

14. The method as claimed in claim 9 wherein the image capture unit is within an image capture array including other instances of the image capture unit positioned at an array position to capture the image reflected from the reflective film.

15. The method as claimed in claim 9 further comprising reflecting, with the reflective film, the image while passing a display light from the first display coupled to the reflective film.

16. The method as claimed in claim 9 further comprising applying, with a control unit, coupled to the image capture unit, an image processing mechanism to the image captured by the image capture unit.

17. A method of operation of an electronic system comprising:
- receiving an image of a first user within a reflective grating spectra for representing the image corresponding to incident light traveling toward a first display and reflected at a first display;
- applying, with a control unit, an image processing mechanism to the image for processing the image corresponding to reflected light reflected at a reflection angle from a reflective film located between the first display and the first user and captured by an image capture unit at a device orientation aligned with the reflection angle, wherein the reflection angle between the reflected light and the first display is less than 90 degrees; and
- communicating the image for displaying the image of the first user on a second display with the image reflected at the reflection angle from the first display in providing gaze alignment between the first user and a second user through the first display and the second display.

18. The method as claimed in claim 17 further comprising applying the image processing mechanism to the image reflected from a mirror for reflecting the image at a mirroring angle toward the image capture unit.

19. The method as claimed in claim 17 further comprising:
- identifying a display light within a display spectra being displayed on the first display coupled to the reflective film; and
- wherein:
- applying the image processing mechanism includes separating the image from the display light based on the display spectra, the reflective grating spectra, or a combination thereof.

20. The method as claimed in claim 17 further comprising:
- determining a viewer position; and
- identifying an image capture unit at an array position in an image capture array based on the array position corresponding to the viewer position for capturing the image reflected by the reflective film.

* * * * *